US008300379B2

(12) United States Patent
Podporkin

(10) Patent No.: US 8,300,379 B2
(45) Date of Patent: Oct. 30, 2012

(54) HIGH-VOLTAGE INSULATOR AND A HIGH-VOLTAGE ELECTRIC POWER LINE USING SAID INSULATOR

(75) Inventor: Georgy Viktorovich Podporkin, St. Petersburg (RU)

(73) Assignee: Otkrytoe Aktsionernoe Obschestvo "NPO Streamer", St. Petersburg (RU)

( * ) Notice: Subject to any disclaimer, the term of this patent is extended or adjusted under 35 U.S.C. 154(b) by 29 days.

(21) Appl. No.: 12/934,555

(22) PCT Filed: Mar. 26, 2009

(86) PCT No.: PCT/RU2009/000142

§ 371 (c)(1), (2), (4) Date: Dec. 16, 2010

(87) PCT Pub. No.: WO2009/120114

PCT Pub. Date: Oct. 1, 2009

(65) Prior Publication Data

US 2011/0102960 A1 May 5, 2011

(30) Foreign Application Priority Data

Mar. 27, 2008 (RU) ................................ 2008111577
Apr. 24, 2008 (RU) ................................ 2008115790

(51) Int. Cl.
*H02H 9/06* (2006.01)

(52) U.S. Cl. ...................................................... 361/117

(58) Field of Classification Search ................... 361/117
See application file for complete search history.

(56) References Cited

U.S. PATENT DOCUMENTS

| | | | | |
|---|---|---|---|---|
| 2,835,725 | A * | 5/1958 | Nicholas | 174/142 |
| 3,184,646 | A * | 5/1965 | Diebold | 361/676 |
| 3,538,241 | A * | 11/1970 | Rein | 174/143 |
| 5,191,503 | A | 3/1993 | Kawamura et al. | |
| 5,283,709 | A | 2/1994 | Shirakawa et al. | |
| 5,493,072 | A * | 2/1996 | Stevens | 174/143 |
| 6,108,187 | A * | 8/2000 | Podporkin et al. | 361/117 |

FOREIGN PATENT DOCUMENTS

RU 949722 A1 8/1982

(Continued)

*Primary Examiner* — Ronald W Leja

(74) *Attorney, Agent, or Firm* — Birch, Stewart, Kolasch & Birch, LLP.

(57) ABSTRACT

The high-voltage insulator for securing a high-voltage conductor in an electrical plant or in an electric power line comprises an insulating core, the first end of which is used for mechanically connecting to a high voltage conductor and/or to its coupling elements, the second end being provided with a metal fastening element for fixing the insulator to a support, such as a tower. In order to impart lightning protection properties to the insulator, it is additionally provided with a multi-electrode system including m electrodes which are mechanically attached to the insulating core and are arranged between the ends thereof. The electrodes are disposed in such a way as to support a formation of an electric discharge between the adjacent electrodes, between the electrode adjacent to the first end of the insulating core and to the high voltage conductor or to said coupling elements, and between the electrode adjacent to the second end of the insulating core and the metal fastening element attached to the tower. The insulator is provided with elements for compensating the reduction of the insulator creepage distance caused by the multi-electrode system. The electric power line using the insulator of this type does not require any lightning arresters.

21 Claims, 12 Drawing Sheets

FOREIGN PATENT DOCUMENTS

| | | | |
|---|---|---|---|
| RU | 1749920 | A1 | 7/1992 |
| RU | 2096882 | C1 | 11/1997 |
| RU | 2107963 | C1 | 3/1998 |
| RU | 2178612 | C2 | 7/2001 |

* cited by examiner

HIGH-VOLTAGE INSULATOR AND A HIGH-VOLTAGE ELECTRIC POWER LINE USING SAID INSULATOR

FIELD OF INVENTION

The present invention relates to high-voltage insulators which can be used for securing high-voltage conductors in electrical plants or in aerial electric power lines and power networks. The present invention also relates to high-voltage electric power lines (HEPLs) employing such insulators.

BACKGROUND ART

There is known a high-voltage support insulator comprising an insulating ribbed core (in particular, made of porcelain) having sheds and, at its ends, metal flanges serving for fixation of the insulator to a high-voltage conductor and to a support structure (cf. High voltage techniques. Ed. D. V. Razevig, Moscow, "Energiya" Publishing House, 1976, p. 78).

A drawback of the prior art insulator consists in that, in an instance of a lightning overvoltage, a flashover of an air gap between metal flanges takes place, and then under the influence of an operational frequency voltage that is applied to the high-voltage conductor the flashover transforms into a power arc of the operational frequency, which can damage the insulator.

There is further known a technical solution, aimed at protecting the above-described insulator from such a power arc. This solution consists of using so-called protective gaps (see "High voltage techniques". Ed. D. V. Razevig, Moscow, "Energiya" Publishing House, 1976, p. 287) that are formed with the use of metal rods, that are electrically connected parallel to the insulator, with spark air gaps formed between the rods. The length of each of the spark gaps is less than a leakage path along the insulator surface, and less than a length of the flashover across air. Therefore, in an instance of the overvoltage, the flashover is formed not across the insulator, but across the air gap between the rods, so that the power arc of the operational frequency burns between the rods, and not across the insulator surface. A drawback of the insulator employing such protective gap consists in the fact that the flashover across the gap results in a short circuit of the connected power network, which necessitates the emergency shut-down of the high-voltage plant that contains the specified insulator.

There is also known an insulator string comprising two insulators which have rods fixed on their metal connecting terminals as protecting means against the arc formation. Such an insulating string, in contrast with the above-described insulator, additionally comprises a third intermediate rod electrode secured to a metal link in form of a length of chain between the insulators (see, for example, U.S. Pat. No. 4,665,460, H01T004/02, 1987). Thus, in such an insulating string, instead of a single spark air gap, two such gaps are formed. This feature made it possible to improve somewhat arc quenching ability of the insulator string equipped with the arc-protecting rods and to ensure the quenching of moderate follow currents (of the order of tens of amperes) in cases of single phase-to-ground short circuits. However, this device is unable to quench currents exceeding 100 A, which currents are typical for two- or three-phase-to-ground short circuits in lightning overvoltage cases.

From the technical aspects, the closest prior art for the invention is constituted by an insulator which has a cylindrical insulating core and spiral sheds. At the ends of the insulating core, first and second metal electrodes are fixed, while inside the insulating core a guiding electrode is located. This electrode has a metal protrusion located in the central part of the cylindrical body that emerges to the surface of the insulating core and functions as an intermediate electrode (cf. Russian patent No. 2107963, H01B17/14, 1998). In an instance of the lightning overvoltage in such an insulator, discharge develops across the surface of the cylindrical insulating core, along a spiral path from said first metal electrode through the intermediate electrode to said second metal electrode. Due to the increased length of the flashover path, a power arc is not formed by the operational frequency voltage, and therefore, the electric plant that contains the insulator continues functioning without shutting down. Thus, in addition to its primary function, such an insulator also provides lightning protection, i.e. functions as a lightning arrester.

However, effectiveness of the prior art insulator as the lightning arrester is limited for the reason that, in cases of substantial atmospheric pollution and/or moisture accumulation, as well as in cases of large overvoltages (exceeding 200 kV), the discharge does not develop along the long spiral path, but along the shortest trajectory, with a breakdown of air gaps between sheds. In such instances, the insulator loses its ability to function as the lightning arrester because, same as in a conventional insulator, the flashover in this insulator transforms into a power arc. In addition, the metal protrusion located in the central part of the insulating core decreases the leakage path and, therefore, decreases allowable voltage for such insulator. Thus, its effectiveness as an insulator is also limited.

There are also known various HEPLs employing combinations of high-voltage insulators (for securing conductors to supports, such as towers or poles) and lightning arresters for protecting such insulators (cf., for example, Russian patent No. 2248079, H02H9/06, 2005, assigned to the applicant of the present invention). In particular there are known the HEPLs comprising the lightning arresters which are configured as various impulse arresters and connected parallel to the insulators (see for example, U.S. Pat. No. 5,283,709, H02H001/00, 1994, and RU 2002126810, H02H9/06, 2004).

As for the closest prior art for the proposed technical solution, the HEPL that may be indicated is disclosed in Russian patent No. 2096882, H02G7/00, 1997 (assigned to the applicant of the present invention). The prior art HEPL comprises supports, insulators secured to the supports by means of metal fixing devices, at least one conductor operating under a high voltage, the conductor being connected to the insulator by means of coupling means, and means for protecting the insulators against lightning overvoltages, said means configured as impulse arresters.

If the impulse arresters are properly selected and connected, the prior art HEPL ensures a highly reliable lightning protection. However, a necessity to use a large number of the impulse arresters substantially increases the complexity of the HEPL, with a corresponding increase of manufacturing and assembling costs.

DISCLOSURE OF THE INVENTION

The first objective that is solved by the present invention consists in developing a high-voltage insulator of moderate manufacturing and operational costs capable of reliably and effectively performing the functions of an insulator and a lightning arrester. Configured in this way, the insulator of the present invention will be applicable for securing power line element operating under a high voltage, for example high-voltage HEPL conductors, as well as wires or cables in electrical substations and in other electrical equipment.

Correspondingly, another objective of the present invention consists in developing a high-voltage electric power line (HEPL) with improved technical and economic characteristics, namely high functional reliability when operating under lightning overvoltages and a simplified design (with a corresponding lower cost) in comparison with prior art HEPLs. Another technical outcome of the present invention is the improvement of power transmission reliability.

The above-specified first objective can be attained by developing a high-voltage insulator for securing, either as a single insulator or as a component of an insulator stack or string, as well as a high-voltage conductor in an electrical installation or in an electric power line. The insulator comprises an insulating core and a fixing device consisting of first and second fastening elements, said fastening elements are located at the opposite ends of the insulating core. The first fastening element is configured to connect, either directly or via coupling means, to the high-voltage conductor or to the second fastening element of the preceding high-voltage insulator of said insulator stack or string. The second fastening element is configured to connect either to supports of the power line or to the first fastening element of the subsequent high-voltage insulator in said insulator stack or string. The insulator of the invention is characterized in that it additionally comprises a multi-electrode system (MES) consisting of m ($m \geqq 5$) electrodes mechanically connected with the insulating core. The MES electrodes are located between the ends of the insulating core and under the impact of a lightning overvoltage are configured to form an electric discharge between the first fastening element and an electrode or electrodes adjacent thereto, between the adjacent electrodes, and between the second fastening element and an electrode or electrodes adjacent thereto.

Distances between adjacent MES electrodes, i.e. lengths g of the spark discharge gaps, are selected based on the required breakdown voltage value for these gaps. More specifically, the selected lengths may be in the range of 0.5 mm to 20 mm, depending on the voltage class of the insulator and on its intended use, as well as on the type of overvoltages to be dealt with when using the insulator (i.e. induced overvoltages or overvoltages resulting from a direct lightning strike). For a wide range of practical applications of the invention, the preferable value of g corresponds to a few millimeters.

The number m of MES electrodes is determined by taking into consideration a number of factors, including the insulator voltage class and the intended application of such an insulator, as well as the type of overvoltages insulator will be handling, the range of currents in the power arc following the overvoltage, and conditions for quenching such arc (these conditions are described, for example, in RU 2299508, H02H3/22, 2007). As will be explained below, it is advantageous to make a minimal number of the electrodes to be equal to 5, whereas, in instances of high currents in the arc, the total number of electrodes in the insulator of the invention may be increased to 200 and more. However (as it should be evident to persons skilled in the relevant art), introducing a a large number of the electrodes to the insulator will result in a substantial decrease of the insulator's creepage distance, causing a substantial deterioration of its insulating properties, including a decrease of a allowable maximal voltage at which the insulator may be employed.

In order to avoid undesirable consequences of introduction of the MES that contains a large number of the electrodes, it is proposed that the insulator be provided with additional means that would compensate shortening of the insulator creepage distance caused by the MES. The compensating means are preferably configured with the leakage path along an insulating surface at least between a part of the electrodes (forming κ pairs of adjacent electrodes, where $3 \leqq k \leqq m-1$), with the length of said leakage path exceeding the length of the air discharge gap between said adjacent electrodes and the length of one of the specified electrodes. The scope of the invention encompasses a number of embodiments of compensating means. Selecting a particular value for κ and a specific embodiment of said means should be made depending on the employed high-voltage insulator and on its specific functioning conditions.

According to one example embodiment of the present invention, the MES electrodes have a T-shaped profile. In other words, each electrode is provided with a narrow leg, by which it is attached to the insulating core, and with a wide beam oriented towards the adjacent electrode. The compensating means in this embodiment are constituted by parts of the insulating core enclosed between the legs of the electrodes and by air gaps between the electrodes.

In an alternative embodiment, the electrodes are embedded in the insulator, while the compensating means are formed by a layer of an insulating material separating the electrodes from an insulator surface, and by cuts (i.e. shaped as slits or circular apertures) formed between the adjacent electrodes and reaching the insulator surface. In order to increase a creepage distance along the insulating surface between the adjacent electrodes, a depth of each cut preferably exceeds a depth at which the electrodes are embedded. With the same purpose the distances between the opposing sides of the segments of cuts, which are located deeper than the electrodes, should preferably exceed the width of the cuts near the insulator surface, i.e. make cuts with the width varying in a radial direction.

Alternatively, compensating means can be configured with at least one of the insulating elements located on the insulator surface (for example, on the surface of the insulating core). The single insulating element or each of the insulating elements shall be located in such a way as to spatially separate the electrodes from the insulator surface. According to one embodiment, each insulating element carries a single electrode, so that in this embodiment there are m insulating elements shaped as projections from the insulator surface.

In other embodiments, one or more, in a general case n insulating elements ($n \geqq 1$) can be shaped as one or more of the spiral insulating sheds projecting from the surface of the insulating core. Electrodes can be arranged on one or more insulating sheds and/or on remaining (separate) insulating elements (i.e. with each remaining insulating element carrying a single electrode). In the latter case, the maximal total number of the insulating elements is m+n.

If at least one spiral insulating shed is used for carrying one or more of the electrodes, the electrodes are arranged on the end (or front) surface of said at least one singular or multiple spiral insulating shed. In this case, a cut in the insulating shed should be preferably formed between each electrode pair.

The present invention can be implemented using various types of insulators, including insulators having insulating cores of substantially cylindrical shape or shaped as a truncated cone or a flat disk. If the insulator of the invention has the disk-shaped insulating core with at least one insulating shed, said shed is preferably made projecting from a lower (bottom) disk surface.

The first objective can also be attained by the proposed second basic embodiment of the high-voltage insulator for securing, either as a single insulator or as a component of an insulator stack or of an insulator string, as well as a high-voltage conductor in an electrical installation or in an electric power line. The insulator comprises an insulating core and a fixing device consisting of a first fastening element and a second fastening element, said fastening elements located at the opposite ends of the insulating core. The first fastening element is configured to connect, either directly or via coupling means, to the high-voltage conductor or to the second fastening element of the preceding high-voltage insulator in said insulator stack or string. The second fastening element is configured to connect to the support of the power line or to the first fastening element of the subsequent high-voltage insulator of said insulator stack or string. The insulator of the invention is characterized in that it additionally comprises a multi-electrode system (MES) consisting of m (m≧5) electrodes that are mechanically connected with the insulating core and arranged so as to support a formation of an electric discharge between adjacent MES electrodes. The MES is arranged at a right angle to the insulator leakage path, along one or more of equipotential lines of electric field of the operational frequency surrounding the insulator. The insulator further comprises a first and a second linking electrodes. Each of these first and second linking electrodes is spatially separated from the insulating core by an air gap and is electrically connected by its first end, galvanically or via an air gap, respectively with the first fastening element and with the second fastening element, and by its second end via an air gap respectively with the first end and with the second end of the MES.

In an instance of the overvoltage, a high voltage potential is applied, via the first linking electrode, to one end of the MES (that is to one of its end electrodes), while a low potential is simultaneously applied, via the second linking electrode, to the other end of the MES.

The location of the MES being perpendicular to the electric field of operational frequency, i.e. perpendicular to the insulator's leakage path trajectory, practically does not reduce the creepage distance. Therefore, the installation of the MES in this basic embodiment does not require any means to compensate a reduction of the creepage distance, which makes it possible to provide a low cost insulator while ensuring high reliability of its operating both as an insulator and as a lightning arrester.

If the insulator has a conical insulating core, the MES should be arranged on the bottom (flat) surface of said body (insulating core). If the disk insulator (also termed as a cap and pin insulator) is formed with concentric sheds on the lower side of the disk-shaped insulating core, it is feasible to arrange the MES along the periphery of the insulating core. However, the MES should preferably be located on one of the bottom (flat) surfaces of said core's sheds.

In an alternative insulator embodiment, the MES consists of at least two sections arranged along at least two equipotential lines, the lines being mutually spaced in a direction oriented at the right angle to the insulator leakage path. These MES sections are interfaced by means of interfacing electrodes located at the ends of said sections and are not connected with fastening elements of the fixing device. Pairs of the interfacing electrodes are interconnected galvanically or via an air gap. For implementing this embodiment, an insulator with a conical insulating core can also be employed. However, in this case it is advantageous to use a disk insulator with concentric sheds on the lower side of the disk-shaped insulating core. Then each section of the MES can be arranged on the end surface of one of the concentric sheds.

For the attainment of the second object of the invention, there is proposed a high-voltage electric power line (HEAL) comprising supports, single insulators and/or insulators assembled in insulator stacks or strings, and at least one high-voltage conductor that is connected directly or via coupling means to the fastening elements of fixing devices comprised of said single insulators and/or to the first insulators of the insulator stacks or strings. Each single insulator or each insulator stack or string is fixed at one of the supports by means of a fastening element of its fixing device that is adjacent to said support. At least one of the insulators employed in the HEPL is the insulator according to the invention, corresponding to any of the above-described embodiments. Thus, the above-specified object of improving functional reliability when functioning under lightning overvoltages, with a simultaneous simplification of the HEPL design, is achieved due to the fact that at least one insulator (preferably at least one insulator per each support of the HEPL) performs, in addition to its basic functions, also the lightning protection function, so that there is no need to employ separate lightning arresters.

BRIEF DESCRIPTION OF THE FIGURES

Reference will now be made to the accompanying drawings wherein.

BEST MODE FOR CARRYING OUT THE INVENTION

Figure 1:
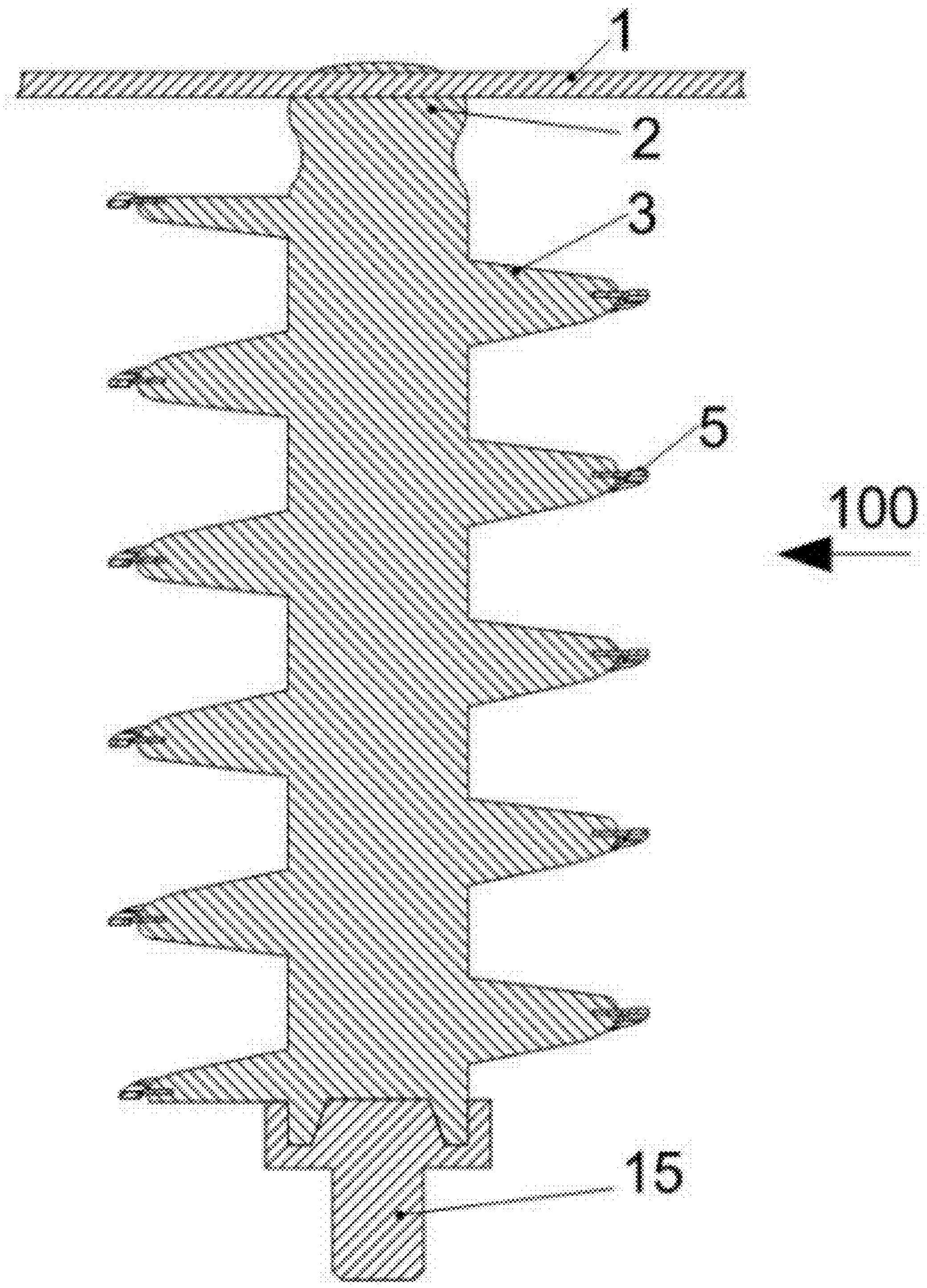
FIG. 1 shows, in an axial section, the first embodiment of the insulator with a spiral shed and with electrodes in the form of T-shaped metal plates.
Figure 2:
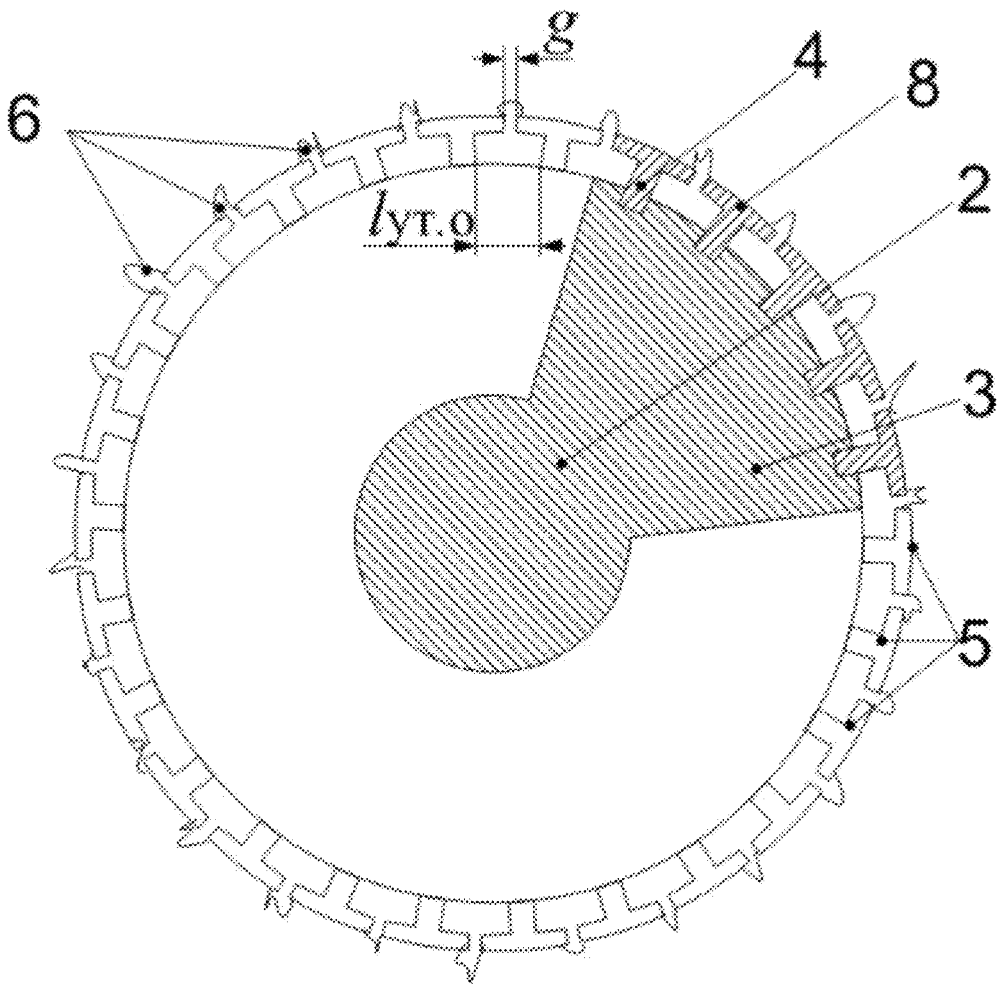
FIG. 2 is a cross-sectional view of the insulator shown in FIG. 1.

FIGS. 1 and 2 show a single cylindrical support insulator 100 made of a hard dielectric (such as porcelain) and having a cylindrical insulating core 2 with a spiral insulating shed 3. The insulator is used for securing a high-voltage conductor (a conductor subjected to a high voltage) 1, for example, in a HEPL of the type illustrated in FIG. 18. With the aid of a metal fixing device that consists of a first (upper) fastening element (not shown) and a second (lower) fastening element 15 the insulator is connected respectively with a high-voltage conductor 1 and with a grounded conductive support 16 (see FIG. 18).

According to a first main embodiment of the invention, the insulator additionally comprises a multi-electrode system (MES) consisting of m electrodes 5. The minimal value for m can be appropriately determined according to a principle that is worked out for of a long-flashover arrester of loop type rated at 10 kV (LFAL-10). This arrester, widely employed in high-voltage electric power lines, is supplied with a MES according to teachings of Russian patent No. 2299508, H02143/22, 2007. The operating experience gained with exploiting the LFAL-10 arrester confirmed that the arrester is capable to ensure a reliable lightning protection on condition its MES comprises not less than 15 intermediate electrodes, with arc quenching occurring at the moment of a first transition of a follow current through a zero value. Taking into account that the insulator of the invention is intended to be used in power lines that are designed for voltages of 3 kV or higher, the value of m for the insulator shall not be less than 5.

According to the shown first embodiment of the inventive insulator, the electrodes 5 are fixed to the external (peripheral) surface of the spiral shed 3. As indicated above, the distances between the adjacent electrodes 5, i.e. the lengths g of spark discharge gaps, may be selected in a range of 0.5 mm to 20 mm, with preferable gap values corresponding to few millimeters. In instances when high impulse discharge voltages (of the order of 100 kV and more) which can occur to the insulator at instances of the lightning overvoltages, or when it is necessary to quench a discharge channel immediately after a lightning impulse passes (that is practically without any follow current at the operational frequency), a required number m of the electrodes 5 may correspond to a hundred and more. The location of the MES end electrodes 5 (first and last electrodes) is preferably selected in such a way that the lengths of the spark discharge gaps between each of these end electrodes and the adjacent first or second fastening element are equal or substantially equal to g.

When a large enough lightning overvoltage is applied to the conductor 1, a breakdown of the air gap occurs between the first fastening element (not shown) connected to the conductor 1 (or to its coupling means, not shown) and the first electrode 5 closest to the conductor 1; after that a discharge develops as a cascade discharge, with sequential breakdowns of the spark discharge gaps between adjacent electrodes 5 until the discharge reaches the second fastening element 15 connected to the ground support 16. In this way, the conductor 1 becomes connected with the ground support 16 by a channel consisting of a channel section formed between the first fastening element connected with the high-voltage conductor 1 and the first electrode 5, plus a plurality of short channel segments formed between electrodes 5, as well as a channel section formed between the last electrode 5 and the second fastening element 15 connected to the support 16.

A so-called cathode fall voltage of 50-100 V develops in proximity of the negatively charged electrode surfaces. In conventional discharge systems consisting of two electrodes (a cathode and an anode), the effect of the cathode fall voltage is indiscernible because the total discharge voltage is of the order of kilovolts. However, due to the fact that the insulator of the present invention is comprised of quite a large number of the electrodes (for example, for 10 kV voltage class, when the discharge is to be quenched without the follow current of operational frequency, this number is about 100), the cathode fall voltage plays an important role. In this case, the main part of the total voltage drop in the discharge across the small gaps between the electrodes takes place in the cathode region, so that the large part of common energy, which is released from the discharge channel in the course of the discharge between the electrodes is released just in this region. As a result, the electrodes are heated and, in this way, they cool the discharge channels. After the lightning overvoltage current across the electrodes falls to a zero level, the channel cools quickly, so that its resistance increases. At the same time, the voltage at the operational frequency still remains applied to the insulator. However, owing to a large total resistance of the channel 6, the discharge cannot support itself and so quenches. Therefore, the HEPL using the insulators of the invention continues to operate without an emergency cut-off. Thus, the high-voltage insulator of the invention effectively performs a lightning protection function, while prior art HEPLs need for this purpose special lightning arresters connected to each insulator.

To ensure that the insulator according to the invention reliably performs its main, insulating function with an operational frequency voltage continuously applied to it, even when having pollution and/or moisture on its surface, the Electrical Installations Regulations (EIR) of Russia established a specific effective creepage distance (corresponding to an effective creepage distance of an insulator or an insulator string sufficient to guarantee its reliable functioning, divided by the largest permissible continuous voltage drop $U_{perm}$). According to the EIR, the value of the specific effective creepage distance ($l_{sp}$), which is necessary to the support insulator strings employed in the HEPL 6-750 kV and for pin-type insulators employed on metal supports, depends on the type of power line and on the voltage class (as well as on the degree of pollution) and lie in a range from 1.4 cm/kV to 4.2 cm/kV (see Kuchinsky G. S. et al. Insulation of high-voltage installations, Moscow, "Energoatomizdat" Publishing House, 1987, p. 145). It follows that the total length $L_\Sigma$ of the leakage path between the conductor 1 and the grounded (i.e. is connected with the grounded support) fastening element 15 of the insulator shall not be less than determined according to the following expression:

$$L_\Sigma = U_{perm} \times l_{sp}. \quad (1)$$

The total creepage distance is the sum of: the length ($l_{leak1}$) of the leakage path between the first fastening element of the insulator that is connected with the conductor 1 (or with its coupling means 17) and the electrode 5 that is closest to the conductor 1; the length of the leakage path between m electrodes 5 (this length equals $(m-1)\times l_{leak0}$, where $l_{leak0}$ is the length of leakage path between adjacent electrodes 5, see FIGS. 1 and 2); and the length ($l_{leakm}$) of the leakage path between the last (m-th) electrode 5 and the second (grounded) fastening element 15.

If $l_{leak1} = l_{leak0} = l_{leakm}$, then (1) may be written as:

$$(m+1) l_{leak0} = U_{perm} \times l_{sp}. \quad (2)$$

As already mentioned above, the number of m electrodes, is selected to ensure quenching of the follow current. When m is known, the minimal permissible length of the leakage path between two adjacent intermediate electrodes $l_{leak0}$ can be determined from (2) as follows:

$$l_{leak0} = \frac{U_{perm} \times l_{sp}}{(m+1)}. \tag{3}$$

As may be seen from (3), $l_{leak0}$ is determined by the maximal permissible voltage in the power line, $U_{perm}$, the specific effective creepage distance, $l_{sp}$, and the number of electrodes, m.

In a conventional insulator, the length of an insulator leakage path that is on a spiral trajectory along the bottom (flat) surface of the insulating shed 3 exceeds a length of the shortest leakage path from the conductor 1 to the second fastening element 15 along a spiral formed on the cylindrical insulating core 2. However, arranging the MES electrodes 5 on the peripherical surface of the insulating shed 3 of the insulator 100 results in shortening the leakage path along the spiral formed on that surface. If the total number of the electrodes 5 is large, a length of this leakage path can become less than that of the above-mentioned shortest leakage path. It may be seen from the expression (3) that such situation will result in diminishing the permissible voltage $U_{perm}$, that is in a certain deterioration of insulating ability of the insulator 100. To avoid this undesirable consequence, parts of the electrodes 5 projecting from the shed 3 preferably have, as shown in FIG. 2, a T-shaped profile, that is each of them has a narrow leg 4, by means of which the electrode is fixed to the shed 3, and a wide beam 8. As a result, means for compensating the MES-induced shortening of the insulator leakage path are constituted in this embodiment of the insulator of the invention by segments of the spiral shed 3 and air gaps formed between the legs 4 of the electrodes 5. Further, owing to the legs 4 of the electrodes being narrow, their presence results only in a minor reduction of the total insulating length of the spiral shed 3.

With the MES electrodes 5 shaped as described, the creepage distance $l_{leak0}$ between the adjacent electrodes 5 exceeds a spark discharge gap length g (see FIG. 2). Therefore, the spiral path along the cylindrical insulating core 2 (and not along the spiral shed 3) remains to be the shortest leakage path from the conductor 1 to the second fastening element 15. In other words, the insulator 100 acquires properties of an arrester, while fully conserving its insulating properties. Moreover, in case of moderate requirements to the insulating properties of the insulator 100, the described T-shape (complicating a design of the electrodes 5) can be imparted not to all pairs of the adjacent electrodes, but only to a certain number (k) of such pairs, with k value depending on relationship between the creepage distances along the insulating core and along the spiral shed. In practical situations, an optimal value of K lies in the range $3<k<m-1$. Remaining electrodes 5 can have a more simple and easy to produce shape of plates, bars or cylinders.

An advantage of the above-described insulator embodiment consists in that it can be used in regions with a substantial atmospheric pollution, because dirt cannot accumulate in the gaps between the electrodes.

Figure 3:
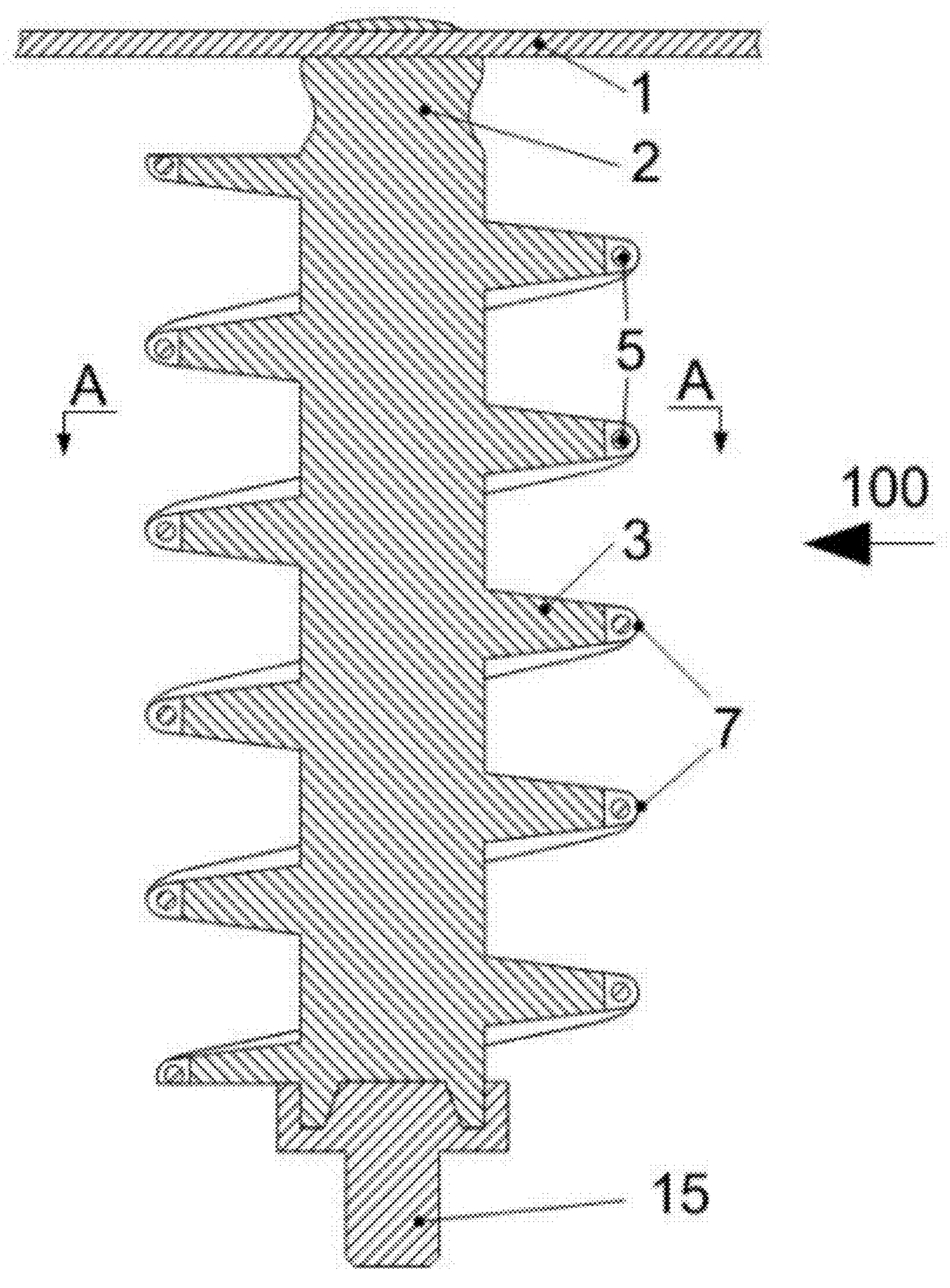
FIG. 3 shows, in an axial section, the second embodiment of the insulator with a spiral shed and with electrodes shaped as short metal cylinders that are embedded in the shed.
Figure 4:
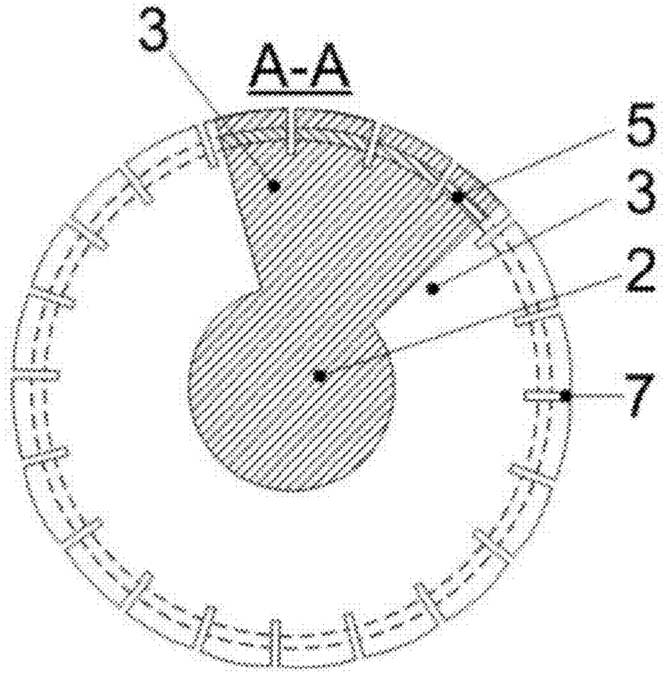
FIG. 4 is a cross-sectional view of the insulator shown in FIG. 3.

FIGS. 3 and 4 illustrate the second example embodiment of the insulator according to the invention, the insulator 100 again having the cylindrical shape with a fixing device consisting of two fastening elements (in FIG. 3 only the second fastening element 15 is shown), with the spiral shed 3 and with the MES electrodes 5 associated with the shed. However, in this embodiment the electrodes 5 are formed as short metal parts of a generally cylindrical shape. In contrast with the preceding embodiment, the MES electrodes are located not outside, but inside the insulator 100 (more specifically, inside its spiral shed 3). In addition, cuts 7, for example shaped as slots having a depth b (exceeding a depth of a location of the electrodes 5) and a width a>g (g being a width of the gaps between the electrodes) are formed in the spiral shed 3, so that the electrodes 5 are separated from each other by small spark discharge gaps g (with g preferably corresponding to several millimeters).

Figure 5:
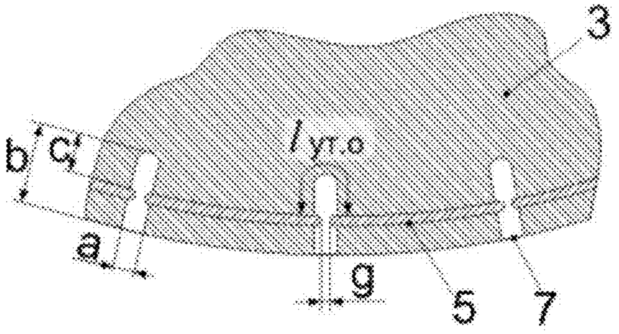
FIG. 5 is a partial enlarged cross-sectional view of an embodiment of the spiral shed of the insulator shown in FIGS. 3 and 4.

As clearly shown (on a larger scale) in FIG. 5, in this embodiment the compensating means (which increase the creepage distance $l_{leak0}$ between the electrodes) are constituted by a combination of a layer of a material of the insulating shed 3, the layer separating the electrodes 5 from the surface of the insulating shed 3, and of the cut 7. This embodiment has an advantage of being easier in manufacturing. In addition, it is possible to obtain a required creepage distance $l_{leak0}$ simply by varying a depth c of the cut 7, that is a depth of that part of the total cut's depth b which is located in a radial direction closer to the insulator axis, and/or by varying thickness of the material dividing the electrodes from the surface of the shed. Further, as may be seen from FIG. 5, another possibility of increasing $l_{leak0}$ consists in making width a of the cuts 7 larger than g.

Figure 6:
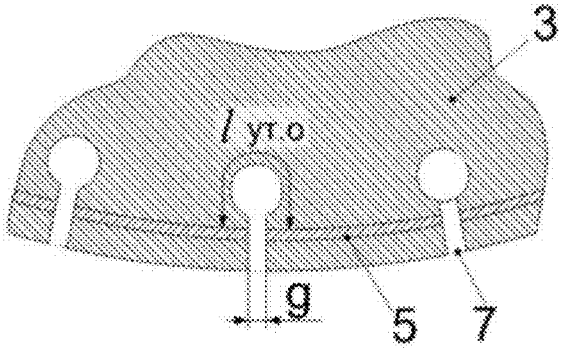
FIG. 6 is a partial enlarged cross-sectional view of another embodiment of the spiral shed of the insulator shown in FIGS. 3 and 4.

As shown (on a larger scale) in FIG. 6, the creepage distance $l_{leak0}$ can be increased also by appropriately shaping the cuts 7. For example, parts of the cuts 7 located at a larger depth than the electrodes 5 can have a shape of a circular cylinder or some other appropriate shape for which shape distances between opposite sides of the cut 7 below the electrodes 5 exceed the cut's width g near the surface of the shed 3. Evidently, shapes of this type also produce an increased $l_{leak0}$ and so improve effectiveness of the means for compensating the reduction of the insulator 100 creepage distance resulting from the use of the electrodes 5.

It shall be further noted that, depending on particular requirements to the insulator 100 and on a relationship between its other parameters (such as the insulating core diameter, the spiral shed total length, etc.), only a part of the cuts 7 can have the above-described special shapes (that is shapes more difficult to manufacture). Similarly, only a part of the cuts 7 can have the increased depth b.

Figure 7:
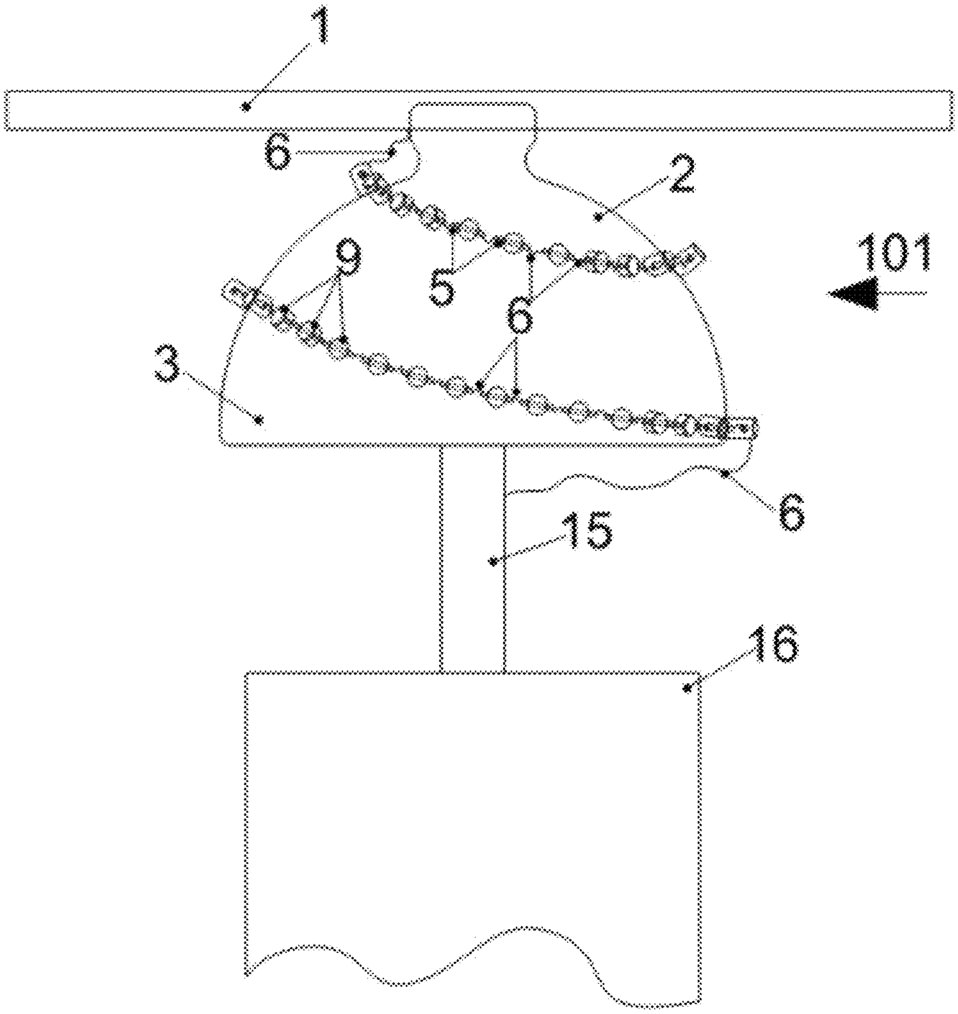
FIG. 7 is a front view of a rod insulator with insulating elements arranged on the surface of its insulating core.
Figure 8:
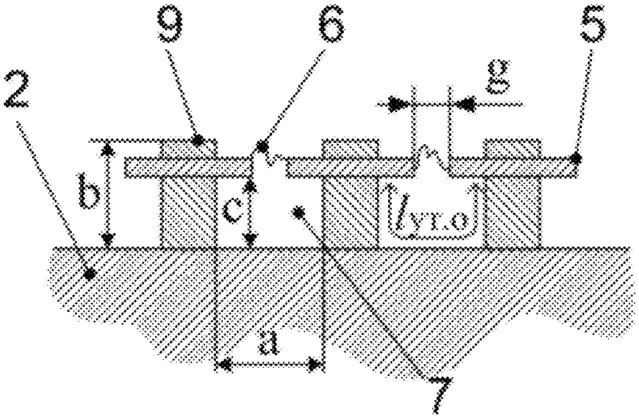
FIG. 8 is a partial enlarged cross-sectional view along a line of the electrodes of the insulator shown in FIG. 7.

FIGS. 7 and 8 illustrate the third example embodiment of the insulator according to the invention. In this embodiment, the insulator is a rod insulator 101 fixed on a support 16 by means of its second fastening element 15 formed as a rod. On the surface of a bell-shaped insulating core 2, along a spiral line, there are positioned m insulating elements 9. In this embodiment, the insulating elements 9 function as the compensating means lengthening a leakage path between the electrodes 5, which are fixed inside the insulating elements 9 and project therefrom. The insulating elements 9, for example, shaped as plates, bars or cylinders, can be made, for example, from silicon rubber and glued to the insulating core 2.

According to this embodiment, the electrodes 5 are formed as circular cylinders (i.e. lengths of wire) and are insulated from each other by small spark gaps g (selected in the range of one to several millimeters). Owing to the use of the compensating means represented by the insulating elements 9, the creepage distance $l_{leak0}$ of the path between the adjacent electrodes 5 is determined (as shown in FIG. 8) by a sum of leak paths along the adjacent insulating elements 9 and a leak path along the insulating core surface between adjacent elements 9, that is $l_{leak0}=2c+a$. In such design, $l_{leak0}$ is substantially larger than the length g of the air gap and larger than a length of any of the electrodes 5. Considering that breakdown strength of the air gap to which an operational frequency voltage is applied substantially exceeds discharge voltages along a polluted and/or wet insulating surface, mounting the electrodes on the insulating elements effectively compensates for a reduction of a total creepage distance along the line of the electrodes 5 location and, in this way, prevents any weakening of insulating properties of the insulator while simultaneously improving its characteristics as a lightning arrester. The above-presented insulator embodiment is of a special practical interest for the reason that standard, mass-produced rod-type porcelain insulators can be used for its manufacture.

However, a necessity to fix to the surface of the insulating core 2 a large number of the insulating elements somewhat complicates manufacture of the high-voltage insulator according to the invention. Therefore, it seems advantageous to combine such elements into a single elongated insulating element or into a several elongated insulating elements projecting from the surface of the insulating core 2. For example, such elongated element (or elements) can be shaped as a spiral insulating shed (or as n such sheds).

The forth embodiment of the insulator according to the invention shown in FIGS. 9 to 12 corresponds to a modification of a suspension disk insulator and is intended to be used as a component of a suspension insulator string consisting of similar insulators. On a lower (bottom) surface of a disk-shaped insulating core 2 of the disk insulator 102, there are formed two insulating spiral sheds. One of them (a shed 10) performs only the insulation function, that is it serves for ensuring a required value of a minimal creepage distance in conditions when the MES is present. In the body of the second insulating shed (the shed 3) a number of the electrodes 5 are embedded. The electrodes are divided by cuts 7, which cuts can be shaped as shown in FIGS. 5 and 6 or, alternatively, as circular apertures (see FIGS. 10 and 12). In order to increase effectiveness of this embodiment as the lightning arrester, gas-discharge chambers are formed between the electrodes.

Figure 9:
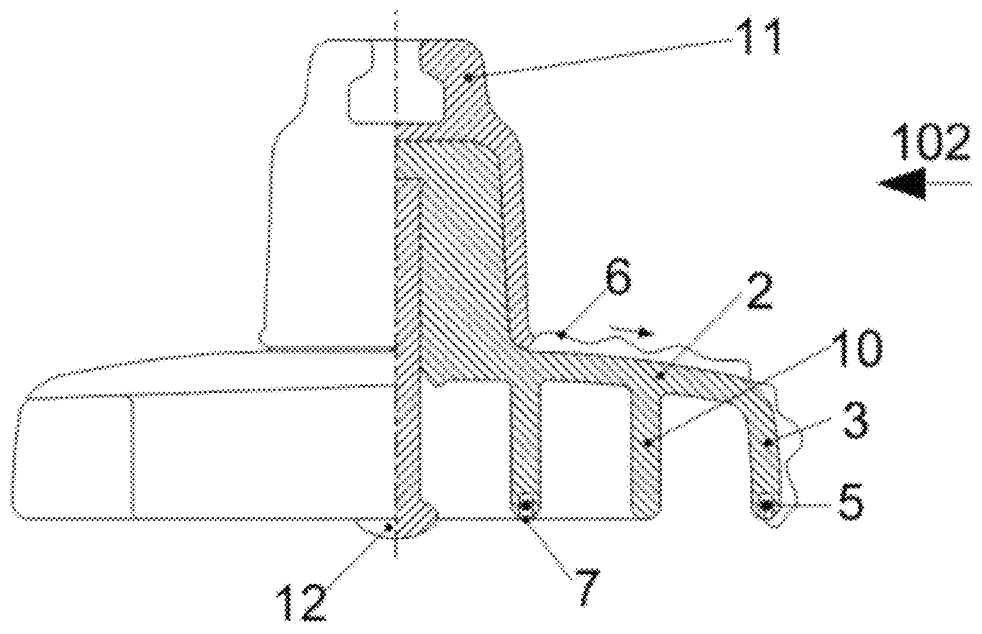
FIG. 9 is a front view, partially in section, of a disk insulator with spiral sheds on the lower side of a disk-shaped insulating core.
Figure 10:
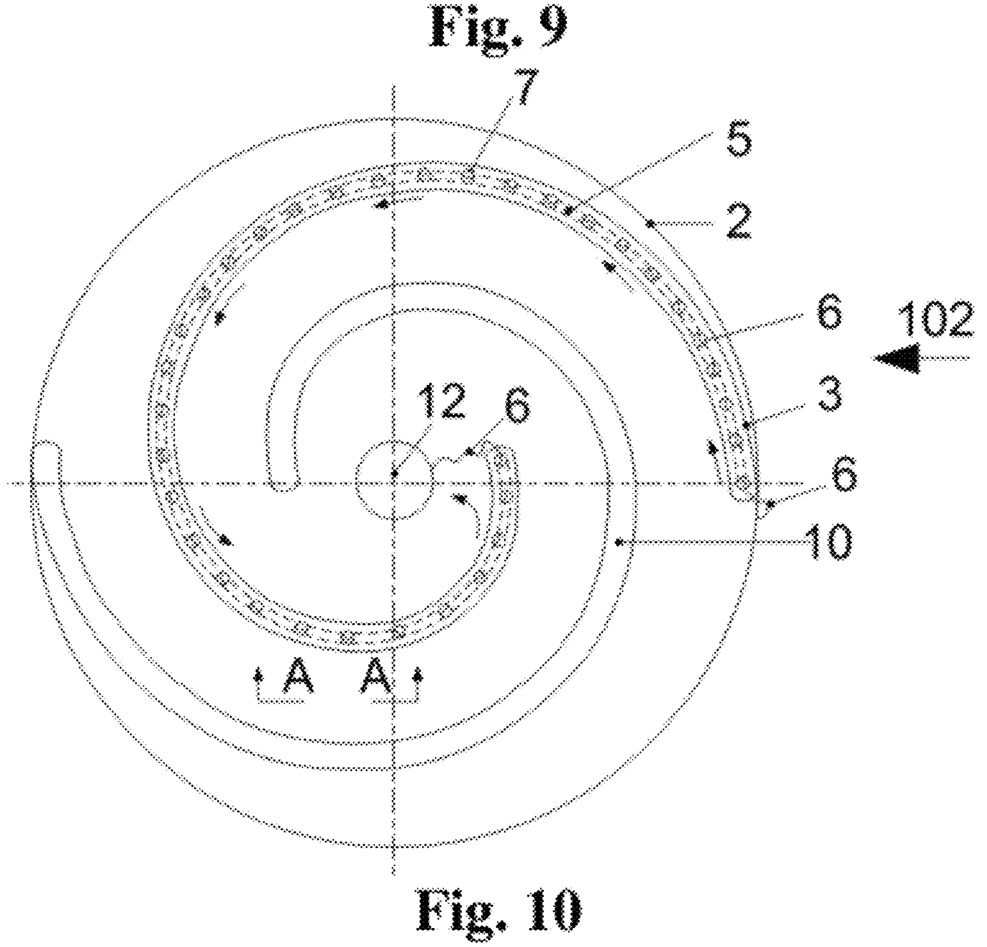
FIG. 10 is a bottom view of the insulator shown in FIG. 9.
Figure 11:
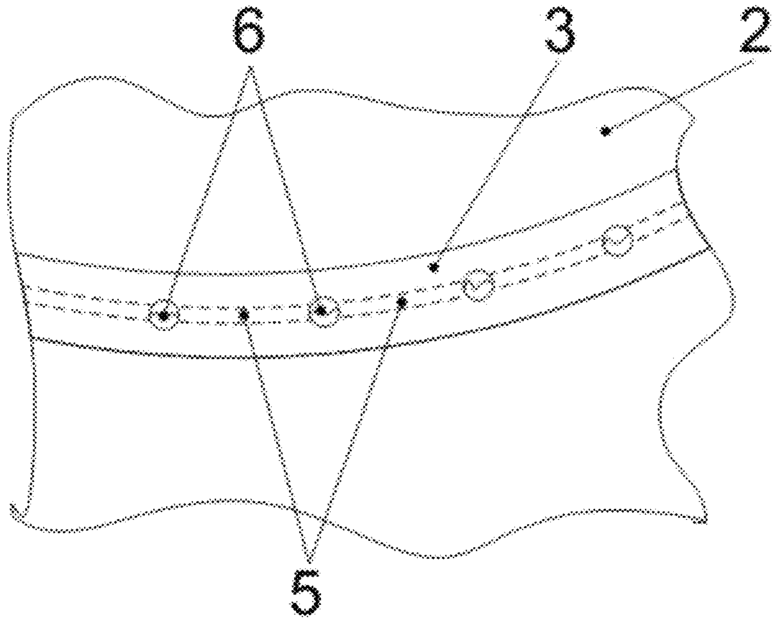
FIG. 11 is a partial enlarged cross-sectional front view of the insulator shown in FIGS. 9 and 10.
Figure 12:
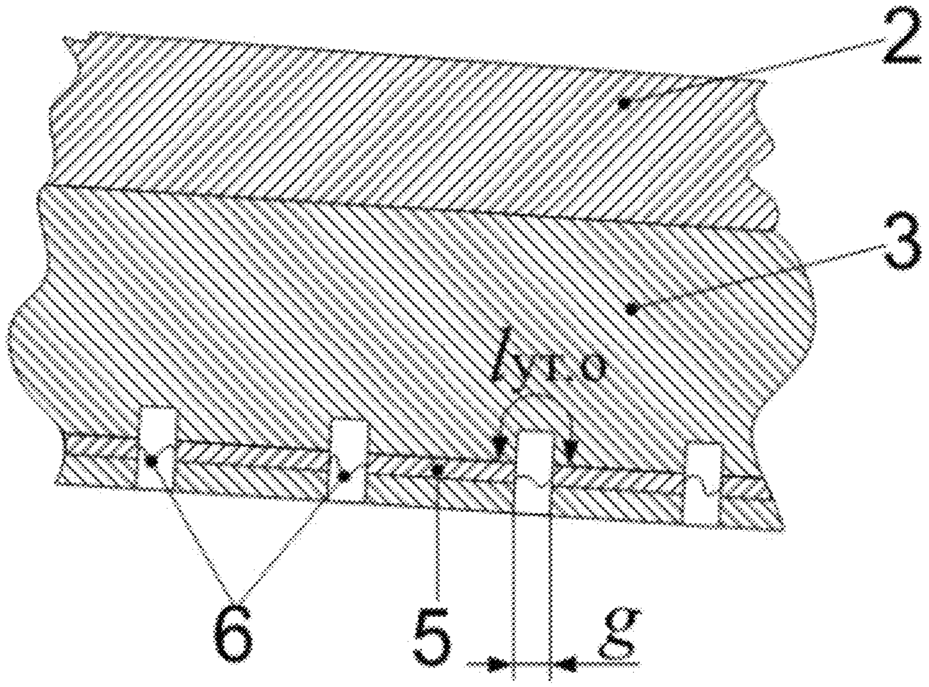
FIG. 12 shows, in a front cross-sectional view, the same part of the insulator as in FIG. 11.

When an impulse overvoltage occurs, a discharge will develop from an insulator cap 11 (that is from its first fastening element) which is in contact with a line conductor (not shown) or its coupling means, or with a pin (a second fastening element) of a preceding insulator of the insulator string) along an upper surface of the insulating core 2 to the first electrode 5 of the MES (see FIG. 9). Then (as shown in FIG. 10) the discharge will produce sequential breakdowns of gaps between the electrodes 5 till it reaches the pin 12. A direction in which the discharge develops is indicated in FIGS. 9 and 10 by arrows. After a spark channel is created, it develops by widening with an ultrasound velocity. Volumes of the spark discharge chambers formed between the electrodes 5 being quite small, a high pressure is created inside them. Under this pressure, spark discharge channels formed between the electrodes 5 are pushed to the insulating core surface and then pushed out into the surrounding air. This pushing force substantially increases effectiveness of arc suppression in comparison with the embodiments illustrated in FIG. 1-8. On the other hand, the cuts in the form of the gas-discharge chambers are prone to pollution. For that reason, the cuts of this type, when used in the insulator embodiment of FIG. 9, 10, are intended preferably for using in regions characterized by a low atmospheric pollution.

Effectiveness of the insulator according to the first basic embodiment of the invention, that is the insulator combining both insulating and lightning arrester functions, was confirmed by comparative tests. Two insulators for the DC voltage class 3 kV, namely: (1) a porcelain suspension insulator L 3036-12 with a spiral shed manufactured by the Czech company Elektroporcelan Lowry a.s., and (2) the insulator according to the invention were tested. The insulator (2) was produced on the base of the insulator L 3036-12, by additionally supplying it with insulating elements positioned along the spiral shed and with a MES. The insulating elements and the electrodes forming the MES were similar respectively to the elements 9 and the electrodes 5 described above with references to FIG. 8. More specifically, sections of 2 mm stainless steel wire cut to the length of 10 mm were used as the electrodes. They were inserted into the insulating elements of 7 mm length cut from a silicon rubber bar having a width of 10 mm and a height of 8 mm. The insulating elements had a semi-circular upper part and were glued to the edge surface of the spiral shed by a special silicone adhesive.

Main parameters of both insulators are presented in Table 1.

TABLE 1

Main parameters of the tested insulators

| Parameters | | Insulator L 3036 12 | Insulator of the invention based on L 3036 12 |
|---|---|---|---|
| Total length, mm | | 262 | 262 |
| Length of a porcelain portion, mm | | 154 | 154 |
| Maximal diameter of a spiral shed, mm | | 125 | 125 + 2 · 8[1] = 141 |
| Pin diameter, mm | | 76 | 76 |
| Number of turns made by the spiral shed | | 6 | 6 |
| Mass ± 10%, kg | | 3.3 | 3.5 |
| Maximal permissible AC voltage, kV | Dry weather | 95 | 95 |
| | Rain | 50 | 50 |
| Impulse discharge voltage, 1.2/50 μs, kV | | 170 | 150 |
| Discharge trajectory | | Through air, along the shortest path | Along a spiral passing through the electrodes |
| Remaining voltage[2], kV | | ~0 | 4 |

Notes:

[1]A height of the insulating elements glued to the insulating spiral shed was 8 mm.

[2]Minimal voltage applied to the insulator after its flashover caused by a lightning impulse.

A length of the edge surface of the spiral shed was approximately 2500 mm. The total number of the electrodes was 240. A length g of air gaps between the electrodes was 0.5 mm. Thus, a total length of the air gaps corresponded to $G=(m+1)\times g=(240+1)\times 0.5=120$ mm. According to the above-mentioned EIR, a specific creepage distance $l_{sp}$ shall be selected, depending on a degree of the atmospheric pollution, in the range of 1.4 to 4.2 cm/kV, so that, for the DC voltage class U=3 kV, a creepage distance shall be calculated as $L_{leak}=U\cdot\sqrt{3}\cdot l_{sp}=3\cdot\sqrt{3}\cdot(1.4\div 4.2)=7.3\div 22$ cm.

It may be concluded from the above calculations that an introduction of the MES can shorten the creepage distance to an unacceptable value. However, as was described above, by employing, according to the invention, insulating elements as the means for compensating the reduction of the leakage path, a creepage distance between adjacent electrodes will be determined according to the expression: $l_{leak0}=2c+a$. In the tested embodiment, a=c=2.5 mm, so that $l_{leak0}=7.5$ mm, and the total creepage distance between the electrodes along the path corresponding to the spiral shed is $L=(m+1)\times l_{ym0}=(240+1)\times 7.5=1807.5$ mm~181 cm. Thus, the insulator of the invention has $L_{\Sigma}>L_{leak}$ practically for all regions independently of their pollution degree.

The tests of both insulators were conducted by applying to them the operational frequency voltage and lightning impulses. The main results of the tests are also presented in Table 1. When only the operational frequency voltage was applied, discharge characteristics of both insulators were practically identical. This means that the installation of the electrodes did not impair insulating properties of the insulator for the operational frequency voltage.

Under an impact of the lightning impulse, a flashover in the prior art insulator forms across the air, along the shortest path, wherein an oscillograph recording attests that the voltage falls practically to zero level, which means that resistance of a discharge channel is quite low. After the lightning flashover forms in such insulator installed in a power line, a follow current will flow across the flashover channel, which means that a short circuit of the line has happened necessitating an emergency shutdown of a corresponding network.

As for the insulator of the invention, its flashover develops along a spiral line passing through the plurality of the electrodes, so that the voltage does not fall to the zero level. On the contrary, there remains a substantial voltage of about 4 kV, which voltage exceeds the operational voltage corresponding to 3 kV. This means that there can be no follow current; in other words, the insulator effectively performs as a lightning arrester: it shunts off the lightning overvoltage in such a way that no follow current is generated, and so prevents the network shutdown.

The above-disclosed embodiments and modifications of the HEPL and the insulator of the invention were described only to clarify principles of its design and operation. It shall be clear to persons skilled in the art that a number of changes in the above-presented examples can be made.

For example, intermediate electrodes shown in FIGS. 1 and 2 can have not the T-shape, but an L-shape, which shape is easier to manufacture. To increase the creepage distance, side surfaces of the electrodes can be covered by an insulation layer. In the embodiment shown in FIGS. 9 and 10, the MES can be installed on both insulating sheds 3 and 10 (instead of only on the shed 3 as shown in FIGS. 9 and 10). In this case, under the impact of the lightning overvoltage, both MES branches will function, so that the follow current will be divided between them, and it will be easier to quench this current. Instead of a single insulator, i.e. one of the insulators shown in FIGS. 1 to 6 and 18, insulator stacks assembled from two or more of such insulators can be used. In addition, the insulator of the invention can be employed, as a single insulator or as a component of the insulator stacks (or strings) not only in the HEPLs, but also in various high-voltage installations, where it can be used for securing not only various conductors, but also busbars.

Figure 13:
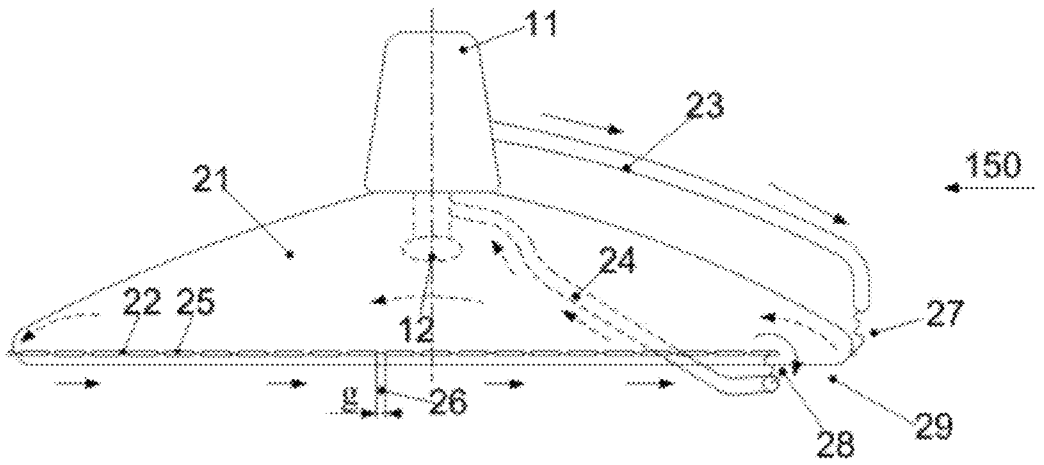
FIG. 13 is a front view of a conical insulator (presented, for clarity, as having transparent parts) with intermediate electrodes arranged along a lower edge of an insulating core.
Figure 14:
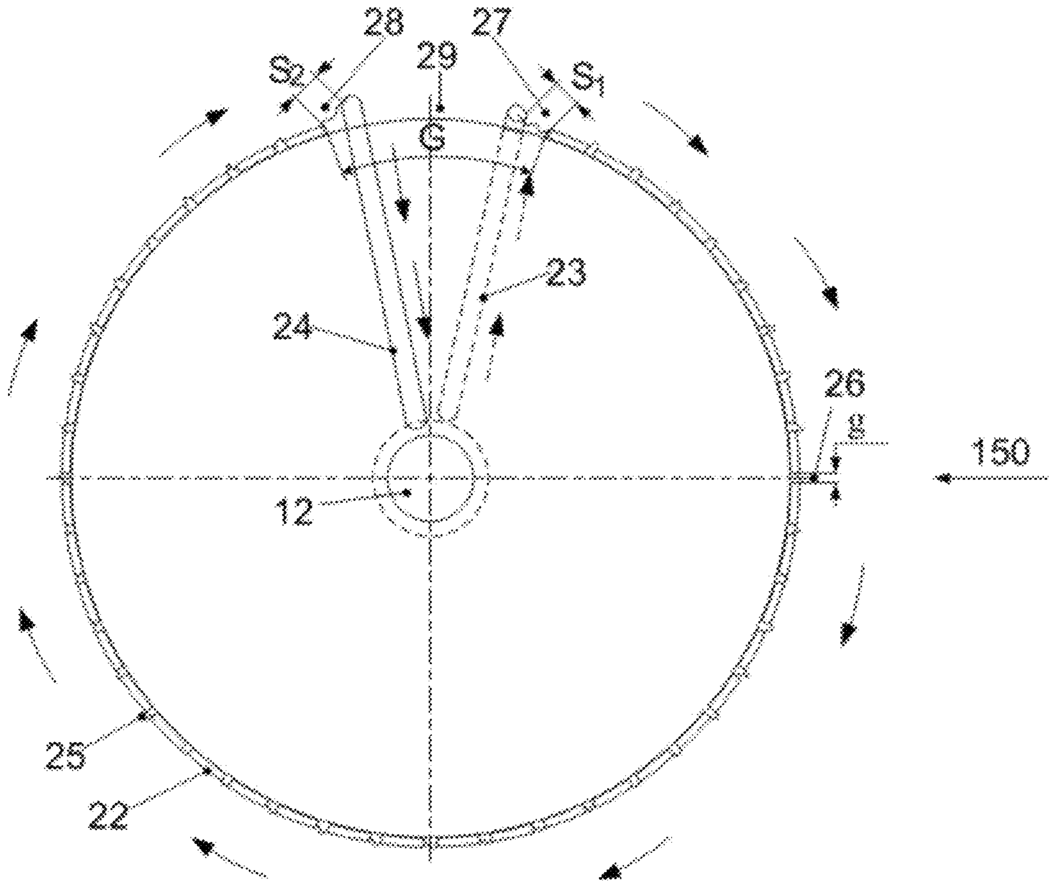
FIG. 14 is a bottom view of the insulator shown in FIG. 13.

In FIGS. 13 and 14 the second basic embodiment of the insulator of the invention is illustrated as an insulator 150 having a tapered insulating core 21 and a fixing device consisting of the first fastening element formed as metal rod 12 and the second fastening element in form of a cap 11. Insulators of this type have good aerodynamic properties and, for this reason, their pollution rate is low. Therefore, they can be used in regions with high atmospheric pollution levels. Along the lower edge of the insulating core, there are located intermediate electrodes 22 separated by gaps 26 of length g, the plurality of the electrodes forming a MES 25. The MES 25 covers a large part of the insulator perimeter. The remaining, smaller part of this perimeter is free from the intermediate electrodes, so that a gap 29 of length G exists between the ends of the MES. A first (lower) linking electrode 24 is associated with one end of the MES (in FIG. 14 this end is located to the left of the vertical insulator axis). The first linking electrode 24, which is electrically connected with the insulator rod 12, forms with the first intermediate electrode 22 an air spark gap 28 of length S2. A second (upper) linking electrode 23 is associated with another end of the MES 25 (in FIG. 14 this end is located to the right of the vertical insulator axis). The second linking electrode 24, which is electrically connected with the insulator cap 11, forms with the last intermediate electrode 22 an air spark gap 27 of length S1.

Figure 15:
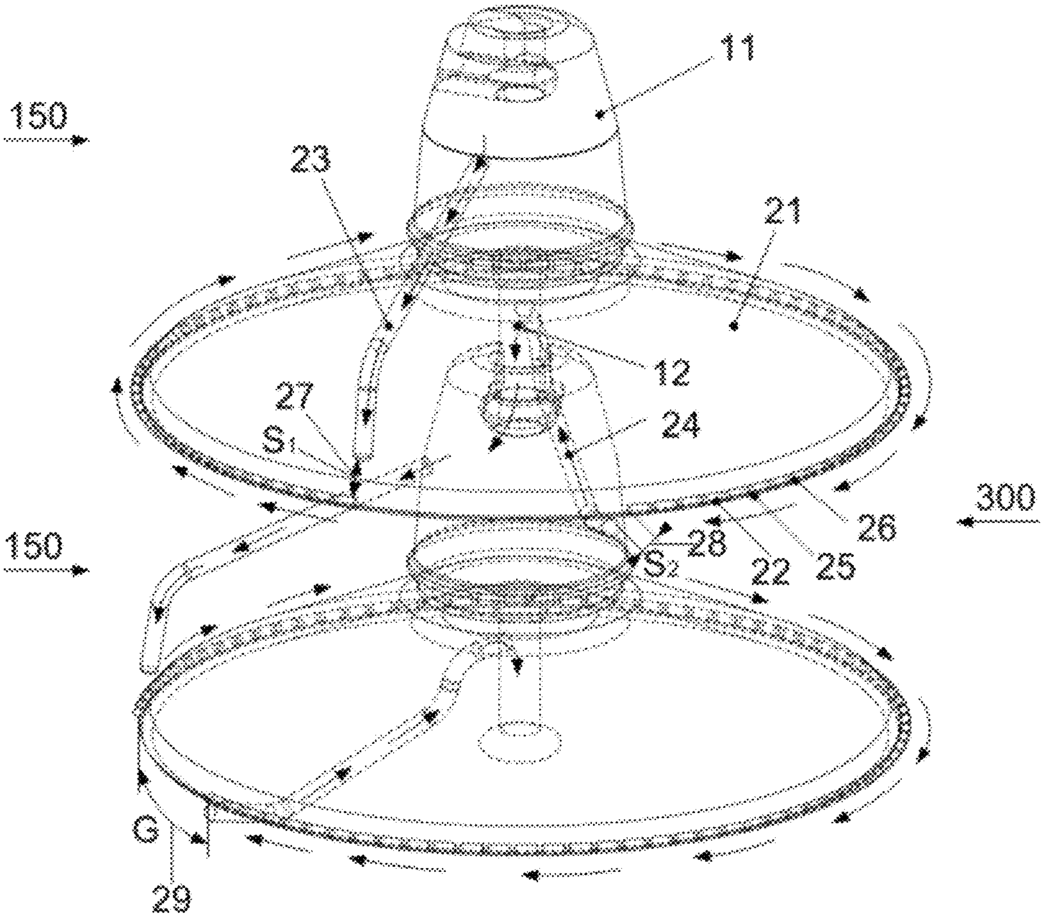
FIG. 15 is a perspective view of insulators of the invention (presented, for clarity, as having transparent parts) constituting a part of an insulator string for a HEPL.

FIG. 15 shows a part of a string 300, the part consisting of two insulators 150 assembled by connecting the second fastening element (the cap) 11 of the first (lower) insulator with the first fastening element (the rod) 12 of the second (upper) insulator. A cap of the upper insulator can be connected with a HEPL support (see FIG. 19) or with a rod of a next (adjoining) insulator (in case the string comprises at least one more similar insulator), while the rod of the lower insulator is connected with a high-voltage HEPL conductor. For better clarity, insulating bodies of both insulators are represented as being transparent.

An overvoltage applied to the insulator 150 brings a breakdown of the air gaps 27 and 28 (see FIG. 13), so that the overvoltage becomes applied to the MES 25, where it initiates sequential breakdowns of the spark gaps 26 between the intermediate electrodes 22. As a result, the cap 11 and the rod 12 of the insulator 150 become electrically connected via a discharge channel consisting of a plurality of small sections, and such structure of the discharge is instrumental for its effective quenching as soon as an overvoltage current falls to zero. It is worth noticing that the addition of the MES of the invention, owing to its location on the lower edge of the insulator, practically does not change the insulating characteristics of the original insulator for the reason the MES is positioned along an equipotential concentric line of the electrical field surrounding the insulator, which line is perpendicular to a shortest leakage path. A creepage distance (the distance along the upper and lower insulator surfaces from the cap 11 to the rod 12) is shortened only by a width of an intermediate electrode. For example, the PSK-70 insulator has a creepage distance of 310 mm, while a width of an intermediate electrode amounts only to 5 mm, so that the leakage path is shortened only by $5/310=1.6\%$. This is true even in cases of high contamination and high moisture content, when the intermediate electrodes 22 are interconnected by conductive dirt. The linking electrodes 23 and 24 are located at a distance of several centimeters from the upper and lower surfaces of the insulator respectively, so that they do not shorten the leakage path across the insulator. A discharge trajectory across the insulator 150 is indicated in FIGS. 13 to 15 by arrows. When the insulator string 300 is employed, the impact of an overvoltage initially causes a breakdown of the spark gaps of the first (in the instant embodiment the lower one) insulator 150 connected to the high-voltage conductor of the HEPL; after that the overvoltage is applied to the second insulator, so that its spark gaps also break down. In case the string comprises more than two insulators, the described breakdown process is repeated for each subsequent insulator.

As was explained above, the total number of the intermediate electrodes 22 constituting the MES shall be not less than 5. A particular number in of the intermediate electrodes, as well as particular values of lengths g, G, S1, S2, respectively for the spark gaps 26 between the intermediate electrodes, the gap 29 between the ends of the MES 25, and the gaps 27, 28 between the linking electrodes 23, 24 and the outermost intermediate electrodes 22 shall be selected such that under the impact of the overvoltage the flashover of the insulator 150 develops according to the above-described scenario, without a flashover of the gap 29. Therefore, a discharge voltage for the gap 29 shall exceed such voltage for in spark gaps g, which means that the length G of the gap 29 shall substantially exceed the total length of m gaps g (G>m×g). The lengths S1 and S2 of the gaps 27 and 28 respectively are selected by way of an experiment.

For example, conducted studies and tests have shown that, when submitted to lightning impulses 1.2/50 μs with maximal voltage of 300 kV, the insulator of the invention (produced on the base of the PSK 70 series insulator with an insulating core having a diameter D=330 mm) ensures the required protection function when having the following parameters: G=90 mm; S1=S2=20 mm; g=0.5 mm and m=140.

Figure 16:
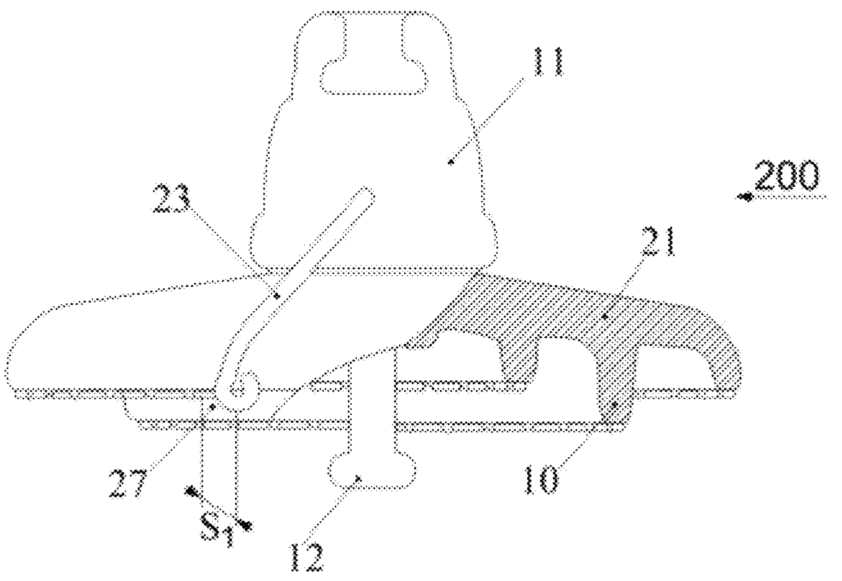
FIG. 16 is a front view, partially in section, of a disk insulator with concentric sheds on the lower side of a disk-shaped insulating core.
Figure 17:
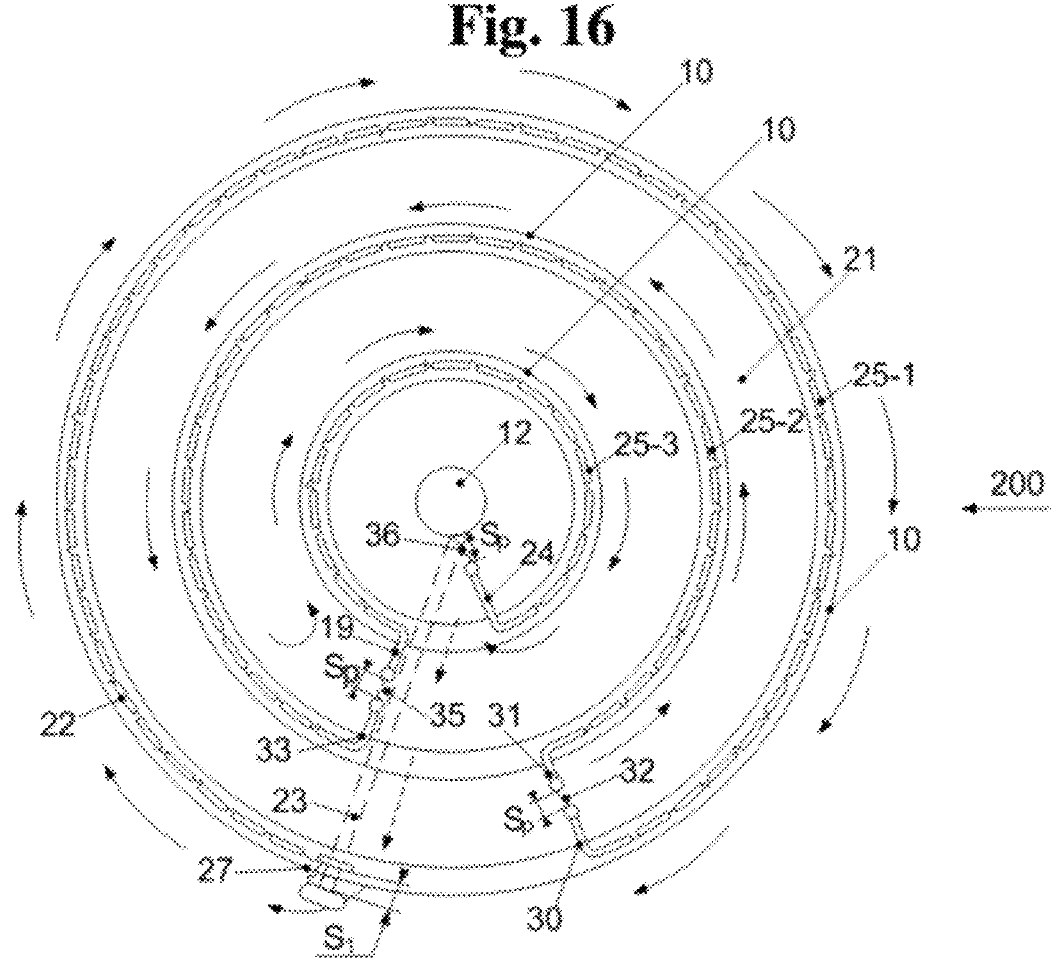
FIG. 17 is a bottom view of the insulator shown in FIG. 16.

FIGS. 16 and 17 illustrate an embodiment of the insulator according to the invention based on the most widely employed disk insulator with concentric sheds 10 on the lower (bottom) side of a disk-shaped insulating core 21. Similar to the above-described insulator embodiment illustrated in FIGS. 13, 14, the insulator 200 shown in FIGS. 16 and 17 comprises a plurality of intermediate electrodes constituting a MES 25. In this embodiment, the MES is divided into three sections 25-1, 25-2, 25-3, with each section located on the end (lower) surface of one of three concentric sheds 10. However, depending on particular conditions for which the insulator is intended, the conditions including a predetermined overvoltage value and a corresponding total number of the intermediate electrodes 22, a MES embodiment arranged, for example, only on a single, i.e. outer, concentric insulating shed or a MES embodiment divided in two sections arranged on any pair of the concentric insulating sheds 10 also can be used. In any case, all intermediate electrodes 22 of the MES 25 in the insulator 200 are also arranged along equipotential lines of the AC electric field surrounding the insulator 200, that is along a line oriented perpendicular to the insulator leakage path. The left end (here and below the terms <<left>> and <<right>> are used in relation to parts of the insulator shown in FIG. 17) of the first section 25-1 of the MES 25 installed on the outer concentric shed 10 of the insulator 200 is associated with an upper (second) linking electrode 23 connected with an insulator cap 11. At the right end of this section 25-1 of the MES (not directly connected to any fastening element), an interfacing electrode 30 is fixed. At the right end of the MES 25 second section 25-2 (adjacent to said right end of the first MES section 25-1) arranged on the middle concentric insulating shed 10, the interfacing electrode 31 is similarly fixed, with a first spark discharge gap 32 of length $S_p$ being formed between two interfacing electrodes 30, 31. One more interfacing electrode 33 is fixed at the left end of the MES section 25-2.

In the similar way, another interfacing electrode 34 is fixed at the left end of the third MES section 25-3 (adjacent to said left end of the second MES section 25-2) arranged on the inner concentric shed 10, with the first linking electrode 24 being associated with the right end of the third MES section 25-3. The second spark discharge gap 35 of length $S_p$ is formed between the interfacing electrodes 33, 34, with the similar, third spark discharge gap 35 of length $S_p$ being formed between the linking electrode 24 and a rod 12 of the insulator 200.

An impact of the overvoltage initially causes a breakdown of the gap 27 between the upper linking electrode 23 and the outmost left intermediate electrode 22 of the first MES section 25-1 (see FIG. 17). This breakdown is followed by sequential breakdowns of all discharge gaps of the first MES section. After that, the gap 32 between the interfacing electrodes 30, 31 of the first and the second MES sections 25-1, 25-2 breaks down, followed by breakdowns of: all discharge gaps of the second MES section 25-2; the spark discharge gap 35 between interfacing electrodes 33, 34 of the second and the third MES sections 25-2, 25-3; all discharge gaps of the third MES section 25-3; and, finally, the spark discharge gap 35 between the first linking electrode 24 and the rod 12. A flashover path is indicated by arrows in FIGS. 16 and 17. The cap 11 and the rod 12 of the insulator 200 become electrically connected via a discharge channel divided into a plurality of small sections, with such discharge structure being instrumental for effective quenching of the discharge after the overvoltage current falls to a zero level as has been described above.

The above-described embodiment of the insulator according to the invention with the intermediate electrodes located on two or more of the concentric insulating sheds is preferable for providing a largest possible number of the intermediate electrodes with the aim to increase effectiveness of quenching of overvoltage discharge channels. Owing to that all intermediate electrodes 22 of the MES 25 in the insulator 200 are arranged along the equipotential lines of the electric field of the operational frequency surrounding the insulator 200, that is at a right angle to the shortest leakage path in the insulator, the introduction of the MES results in shortening the insulator creepage distance only by a width of an intermediate electrode multiplied by a number of the MES sections (which number in the instant embodiment equals 3).

Obviously, in case only two MES sections (for example, the sections 25-1 and 25-2) are used, two interfacing electrodes 33, 34 become unnecessary, while the first linking electrode 24 will be connected with that end of the MES 25 which is not connected with the second linking electrode 23. Similarly, if the MES 25 is arranged only on a single concentric insulating shed 10 (for example, on the outer one), there is no need to use any interfacing electrodes. In such embodiments, the shortening of the insulator creepage distance will correspond respectively to two widths and to one width of the intermediate electrode.

Effectiveness of the insulator according to the second basic embodiment of the invention combining both insulating and lightning protection functions has been also confirmed by comparative tests. Two insulators for AC voltage class 10 kV have been prepared for such tests: a suspension glass insulator PSK-70 having a smooth tapering insulating core, and the insulator of the invention. The latter insulator was produced on the base of the PSK-70 insulator but was additionally supplied with intermediate electrodes 22 arranged on the lower edge of the tapering insulating core in the way similar to that described above with references to FIGS. 13 to 15. M2.5 nuts served as the intermediate electrodes The nuts were glued to the surface of the insulator core by a special epoxy adhesive. Lengths g of the air gaps 26 between the electrodes (that is distances between parallel sides of the nuts) were equal to 0.5 mm. The distance between the ends of the MES (that is the length G of the gap 29) was 90 mm; lengths S1, S2 of the gaps 27, 28 were equal to 20 mm.

Other essential insulator parameters are presented in Table 2.

TABLE 2

Main parameters of the tested insulators and test results

| Parameters | Insulator PSK-70 | Insulator of the invention based on PSK-70 |
|---|---|---|
| External diameter, mm | 330 | 334[1] |
| Number m of the intermediate electrodes | 0 | 140 |

TABLE 2-continued

Main parameters of the tested insulators and test results

| Parameters | Insulator PSK-70 | Insulator of the invention based on PSK-70 |
|---|---|---|
| Maximal usable voltage in rain conditions, kV | 40 | 40 |
| Impulse discharge voltage, 1.2/50 μs, kV | 90 | 70 |
| Discharge trajectory | Through air, along the shortest path | Through the MES |
| Remaining voltage[2], kV | ~0 | 6 |

Notes:
[1]The nuts affixed to the insulator surface have a thickness of 2 mm.
[2]Minimal voltage applied to the insulator after its flashover by a lightning impulse.

The tests of both insulators were conducted by applying to them the operational frequency voltage and lightning impulses. The main results of the tests are also presented in Table 2.

When only the operational frequency voltage was applied, discharge characteristics of both insulators were practically identical. This means that the installation of the electrodes did not impair insulating properties of the insulator for the operational frequency voltage.

The insulator of the invention has an impulse discharge voltage of 70 kV, which is lower than an impulse discharge voltage (90 kV) for the basic insulator, because the flashover in the insulator of the invention develops along the MES, and not along the core surface as in the prior art insulator. Therefore, the insulator of the invention can be used as an arrester when connected in parallel to a conventional insulator.

Under an impact of the lightning impulse, a flashover in the prior art insulator forms via the air, along the shortest path, wherein an oscillograph recording attests that the voltage falls practically to zero level, which means that resistance of a discharge channel is quite low. After the lightning flashover forms in such insulator installed in a power line, a follow current will flow across the flashover channel, which means that a short circuit of the line has happened necessitating an emergency shutdown of a corresponding network.

As for the insulator of the invention, its flashover develops along the MES, through the plurality of the electrodes, so that the voltage does not fall to the zero level On the contrary, there remains a substantial voltage of about 6 kV. At a HEPL designed for 10 kV nominal voltage, strings of two suspension insulators are used. In case these insulators are insulators of the invention based on the PSK-70 insulator, a total remaining voltage will be 6 kV+6 kV=12 kV. This value substantially exceeds the largest phase voltage $U_{pl}=U_{nom}\times1.2/1.73=10\times1.2/1.73=7$ kV. This means that there can be no follow current; in other words, the insulator effectively performs as a lightning arrester: it shunts off the lightning overvoltage in such a way that no follow current is generated, and so prevents the network shutdown.

The above-presented basic embodiments of the insulator according to the invention and their modifications were described only to clarify principles of its design and operation. It shall be clear for persons skilled in the art that a number of changes in the above-presented examples can be made. For example, in order to avoid a displacement of the arc along the linking electrodes, they can be covered by an insulation layer. In the embodiment shown in FIGS. 13 and 14, the MES can be arranged along several concentric circles, which will increase the number of the intermediate electrodes and so will increase effectiveness of the follow current quenching (such modification will, however, somewhat increase the insulator's cost). Slight displacements of the intermediate electrodes locations from the equipotential line (if needed to simplify the manufacturing of the insulator of the invention) are also permissible.

Figure 18:
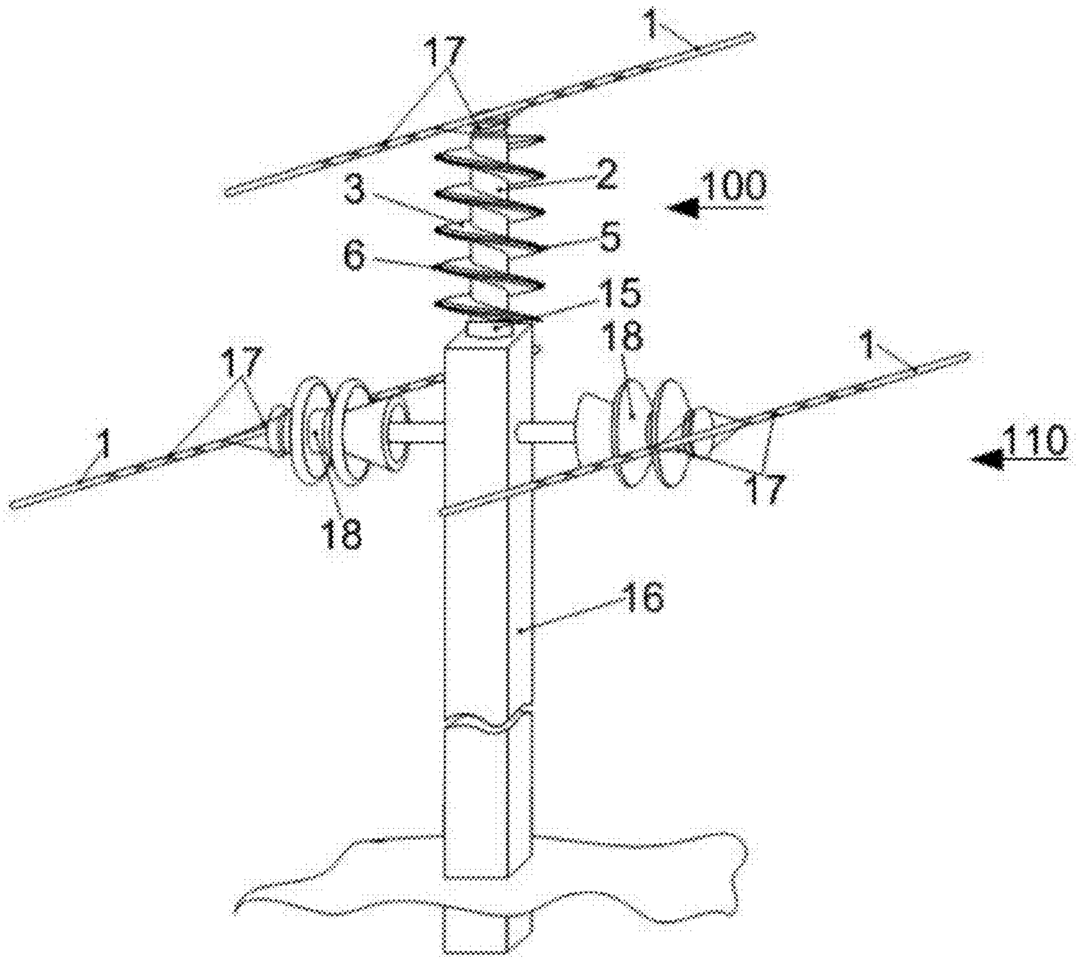
FIG. 18 is a simplified partial view of an embodiment of a HEPL of the invention.

FIG. 18 illustrates an embodiment of a HEPL 10 kV (denoted as 110) employing the insulator embodiment shown in FIGS. 1 and 2. The main part of shutoffs of HEPLs of the 10 kV class is due to induced overvoltages. As was mentioned above, the LFAL-10 arresters are used in Russia to protect the HEPLs from such shutdowns. One such arrester is usually installed at each pole with adjoining arresters associated with different phases. For example, each of the arresters installed at each of the first, second and third poles is associated respectively with one of the phase A, B and C. As illustrated in FIG. 18, the insulators of the invention, for example, the insulators 100 with the spiral shed shown in FIGS. 1 to 6 or the rod insulators 101 shown in FIG. 7, 8 can be installed in a similar way corresponding to one insulator per pole with connecting the adjoining insulators to different phases. The remaining insulators 18 may be of a conventional design. Alternatively, one phase can be supported by a string of the disk insulators 102 of the invention (shown in FIGS. 9 to 12).

Figure 19:
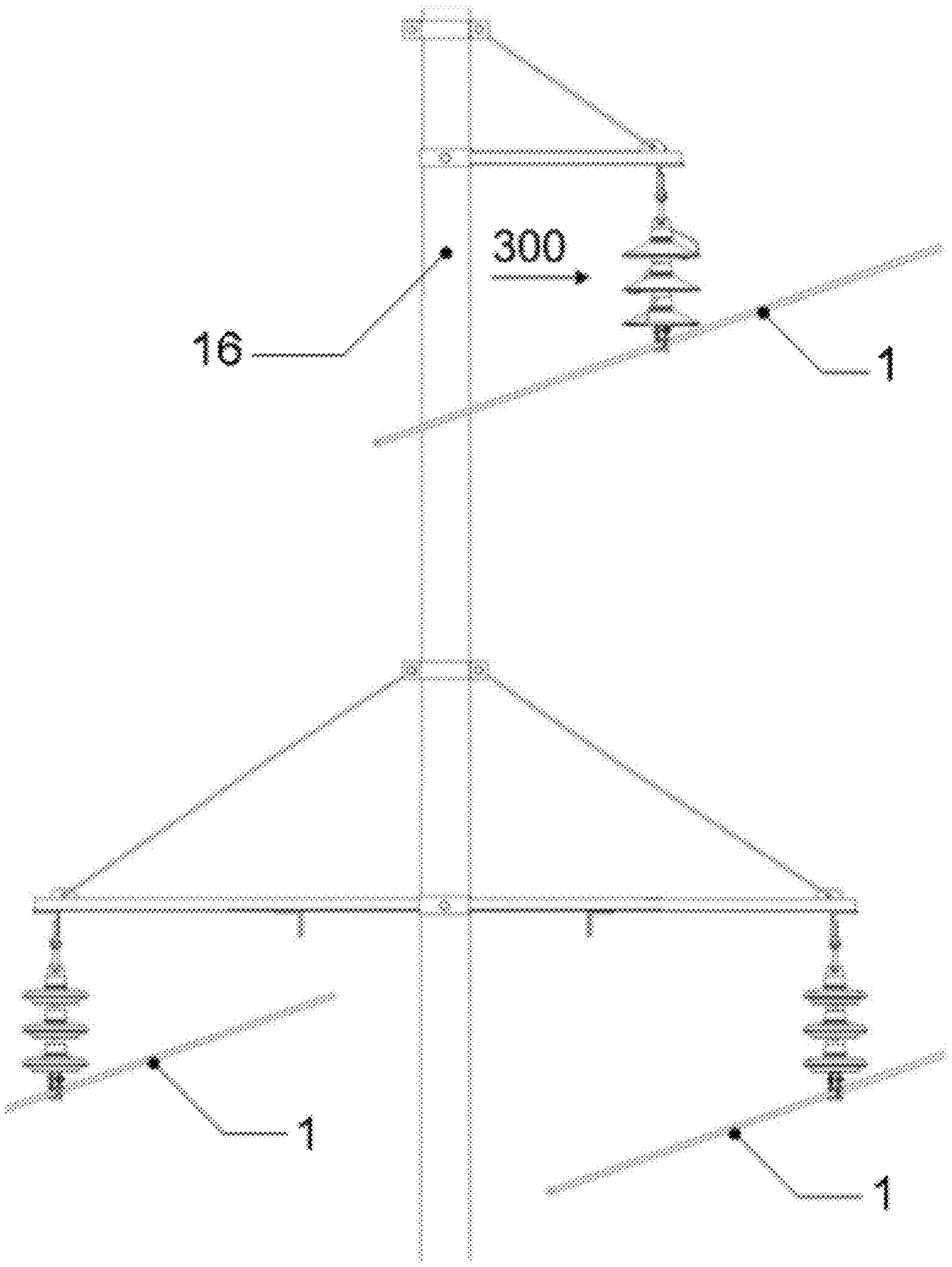
FIG. 19 is a simplified partial view of another embodiment of the HEPL of the invention.

FIG. 19 shows a fragment of a HEPL 35 kV according to the invention. The HEPL comprises three conductors 1 transmitting high voltages corresponding to three different phases. Each of the conductors 1 is mechanically connected to strings of the conical insulators. The insulator strings are fixed to the supports of the HEPL (only a fragment of one of such supports 16 is illustrated in FIG. 19). In the HEPL embodiment of FIG. 19, the insulator string 300 securing an upper HEPL conductor is formed by the insulators of the invention (corresponding to the embodiment illustrated in FIGS. 13 to 15). Lightning protection wires assemblies are conventionally used for ensuring the lightning protection of HEPLs 35 kV. When the insulators of the invention are used for forming an insulator string for the upper phase conductor, such assemblies become unnecessary. During lightning strikes flashover of the insulator string 300 of the invention occurs, so that the lightning current flows through the insulator MES and, owing to a large number of intermediate electrodes, the flashover does not turn into an arc of the follow current of operational frequency, so that the HEPL continues to operate without a shutdown. It is worth to note that the conductor 1 of the upper phase functions as a lightning protection wire for the lower phases, that is the conductor 1 prevents lightning from directly striking these lower phases.

If the HEPL passes through a region with a soil of a high specific resistance, the use of the lightning protection wire becomes ineffective because, due to a high resistance of the support grounding circuit, when a lightning strikes at the lightning protection cable or the support 10, a reverse flashover from the support to the conductor takes place. In such cases, it is advantageous to use the insulators of the invention for all three insulator strings. In this way, a reliable protection of the HEPL from lightning overvoltages will be ensured.

All the above-described and other embodiments and modifications of the present invention are within the scope of the attached set of claims.

The invention claimed is:

1. A high-voltage insulator for securing, as a single insulator or as a component of an insulator stack or string, a high-voltage conductor in an electrical installation or in an electric power line, the insulator comprising an insulating core and a fixing device including a first fastening element and a second fastening element, said fastening elements located at the opposite ends of the insulating core, wherein the first fastening element is configured for connecting, directly or via connecting means, with a high-voltage conductor or with the second fastening element of the preceding high-voltage insulator of said insulator stack or string and the second fastening element is configured for connecting to a support of the power line or to the first fastening element of the subsequent high-voltage insulator of said insulator stack or string, the insulator characterized in that it additionally comprises:

a multi-electrode system (MES) including m electrodes, wherein m≧5, mechanically connected with the insulating core and located between ends thereof, the electrodes configured to form, under an impact of a lightning overvoltage, an electric discharge between the first fastening element and an electrode or electrodes adjacent thereto, between adjacent electrodes, and between the second fastening element and an electrode or electrodes adjacent thereto; and means for compensating the reduction of the insulator creepage distance caused by the multi-electrode system.

2. The insulator according to claim 1, characterized in that the compensating means are configured for providing a leakage path along an insulating surface between the electrodes of κ pairs of the adjacent electrodes, wherein 3<κ<m−1 with a length of said leakage path exceeding the aggregate length of an air discharge gap between said adjacent electrodes and the length of the single electrode.

3. The insulator according to claim 2, characterized in that the electrodes have a T-shaped profile, with a narrow leg, by which each of the electrodes is attached to the insulating core, and with a wide beam that is oriented towards the adjacent electrode, wherein the compensating means are constituted by parts of the insulating core that are enclosed between the legs of the electrodes and by air gaps between the electrodes.

4. The insulator according to claim 2, characterized in that the electrodes are embedded in the insulator, wherein the compensating means are formed by a layer of the insulator material separating the electrodes from the insulator surface, and by cuts formed between the adjacent electrodes and reaching the insulator surface.

5. The insulator according to claim 4, characterized in that the cuts are configured as slits of circular apertures.

6. The insulator according to claim 4, characterized in that a depth of each cut exceeds a depth at which the electrodes are embedded.

7. The insulator according to claim 6, characterized in that distances between opposing sides of parts of the cuts located at a larger depth than the electrodes exceed, are selected to exceed the width of the cuts near the insulator surface.

8. The insulator according to claim 2, characterized in that the compensating means are configured with at least one insulating element located on the insulator surface wherein the single insulating element or a combination of insulating elements spatially separating the electrodes from the insulator surface.

9. The insulator according to claim 8, characterized in that it comprises m insulating elements, wherein each insulating element carry a single electrode.

10. The insulator according to claim 8, characterized in that it comprises n insulating elements, wherein n≧1, with each of insulating elements configured as a spiral insulating shed projecting from a surface of the insulating core.

11. The insulator according to claim 10, characterized in that it comprises m+n insulating elements, wherein n insulating elements are configured as the spiral insulating sheds projecting from a surface of the insulating core, while each of m remaining insulating elements carries a single electrode.

12. The insulator according to claim 11, characterized in that the electrodes are located on the end surface of at least one insulating shed.

13. The insulator according to claim 12, characterized in that cuts are formed in the insulating shed between the each pair of adjacent electrodes.

14. The insulator according to claim 1, characterized in that the insulating core is shaped substantially as a cylinder or as a truncated cone or as a disk.

15. The insulator according to claim 10, characterized in that the insulating core is shaped substantially as a flat disk, the first fastening element is configured as an insulator cap, the second fastening element is configured as a pin and at least one of the spiral insulating shed projects from a lower surface of the disk.

16. A high-voltage insulator for securing, as a single insulator or as a component of an insulator stack or string, a high-voltage conductor in an electrical installation or in a electric power line, the insulator comprising an insulating core and a fixing device including a first fastening element and a second fastening element, said fastening elements located at the opposite ends of the insulating core, wherein the first fastening element is configured for connecting, directly or via connecting means, with a high-voltage conductor or with the second fastening element of the preceding high-voltage insulator of said insulator stack or string, and the second fastening element is configured for connecting with a support of the power line or with the first fastening element of the next high-voltage insulator of said insulator stack or string, characterized in that the insulator additionally comprises:

a multi-electrode system (MES) including m electrodes, wherein m≧5, mechanically connected with the insulating core and arranged so as to support a formation of an electric discharge between adjacent MES electrodes, wherein the MES is arranged at a right angle to an insulator leakage path, along one or more of equipotential lines of electric field of the operational frequency surrounding the insulator; and a first and a second linking electrodes, wherein each of the first and second linking electrodes is spatially separated from the insulating core by an air gap and is electrically connected by its first end, galvanically or via an air gap, respectively with the first fastening element and with the second fastening element, and by its second end via an air gap respectively with the first end and with the second end of the MES.

17. The insulator according to claim 16, characterized in that it has a conical insulating core, wherein the MES is located on an upper or a lower surface of the insulator core.

18. The insulator according to claim 16, characterized in that it is configured as a disk insulator with concentric sheds on the lower side of a disk-shaped insulating core, wherein the MES is located on the end surface of one of the sheds.

19. The insulator according to claim 16, characterized in that the MES includes at least two sections arranged along at least two equipotential lines, the lines being mutually spaced in a direction oriented at a right angle to the insulator leakage path, wherein the MES sections are interfaced by means of interfacing electrodes located at ends of said sections not connected with the fastening elements of the fixing device, pairs of the interfacing electrodes being interconnected galvanically or via an air gap.

20. The insulator according to claim 19, characterized in that it is configured as a disk insulator with concentric sheds on the lower side of a disk-shaped insulating core, wherein each section of the MES is arranged on the end surface of one of the sheds.

21. A high-voltage electric power line comprising supports, single insulators and/or insulators assembled in insulator stacks or strings, and at least one high-voltage conductor connected directly or by means of coupling means with fastening elements of fixing devices comprised by said single insulators and/or by first insulators of insulator stacks or strings, wherein each single insulator or each of the insulator stack or string is fixed at one of the supports by means of a fastening element of its fixing device, which is adjacent to said support, characterized in that at least one of the insulators is an insulator configured according to claim 1.

* * * * *